US006177667B1

(12) United States Patent
Fujita et al.

(10) Patent No.: US 6,177,667 B1
(45) Date of Patent: *Jan. 23, 2001

(54) IMAGING DEVICE

(75) Inventors: Kazuhiro Fujita, Tokyo; Ikuo Maeda; Hiroyuki Inoue, both of Kanagawa; Goichi Akanuma, Tokyo, all of (JP)

(73) Assignee: Ricoh Company, Ltd., Tokyo (JP)

( * ) Notice: Under 35 U.S.C. 154(b), the term of this patent shall be extended for 0 days.

This patent is subject to a terminal disclaimer.

(21) Appl. No.: 09/134,603

(22) Filed: Aug. 14, 1998

(30) Foreign Application Priority Data

Oct. 3, 1997 (JP) .................................................. 9-270883
Oct. 3, 1997 (JP) .................................................. 9-271016

(51) Int. Cl.$^7$ ............................ G02B 17/00; G02B 27/10
(52) U.S. Cl. ......................... 250/216; 359/619; 359/622; 359/627; 359/726
(58) Field of Search ................................ 250/216, 208.1; 359/619, 622, 627, 726, 625, 530, 542, 857, 858, 859; 358/471, 474, 476, 475, 484

(56) References Cited

U.S. PATENT DOCUMENTS

| | | | | |
|---|---|---|---|---|
| 4,427,291 | * | 1/1984 | Day | 355/46 |
| 4,468,094 | * | 8/1984 | Inokuchi | 359/885 |
| 4,679,902 | * | 7/1987 | Inokuchi | 359/619 |
| 4,739,159 | * | 4/1988 | Inokuchi | 250/216 |
| 5,035,486 | * | 7/1991 | Inokuchi | 359/625 |
| 5,168,401 | * | 12/1992 | Endriz | 359/625 |
| 5,363,240 | * | 11/1994 | Miyashita | 359/625 |
| 5,570,204 | * | 10/1996 | Kumashiro | 358/471 |
| 5,604,606 | * | 2/1997 | Miyashita et al. | 358/474 |
| 5,907,438 | * | 5/1999 | Fujita et al. | 359/619 |

FOREIGN PATENT DOCUMENTS 5-53245    8/1993 (JP) .

OTHER PUBLICATIONS

Japanese Abstract of 63–225218; Photoconductive Lens Array; Sakanobu Takahashi; Sep. 20, 1988 (with English translation).

* cited by examiner

Primary Examiner—John R. Lee
(74) Attorney, Agent, or Firm—Oblon, Spivak, McClelland, Maier & Neustadt, P.C.

(57) ABSTRACT

An imaging device includes a lens array in which lenses are arranged in a line, the lenses being optically equivalent, a roof mirror array having roof mirrors arranged in a line parallel to a direction in which axes of the lenses of the lens array are arranged, and an aperture member having apertures arranged so as to correspond to the lenses of the lens array. The center of an interval between axes of adjacent lenses of the lens array corresponds to a ridge line of the roof mirror array, and wherein at least two roof mirrors are provided with respect to each of the lenses of the lens array.

16 Claims, 37 Drawing Sheets

PRIOR ART FIG.1
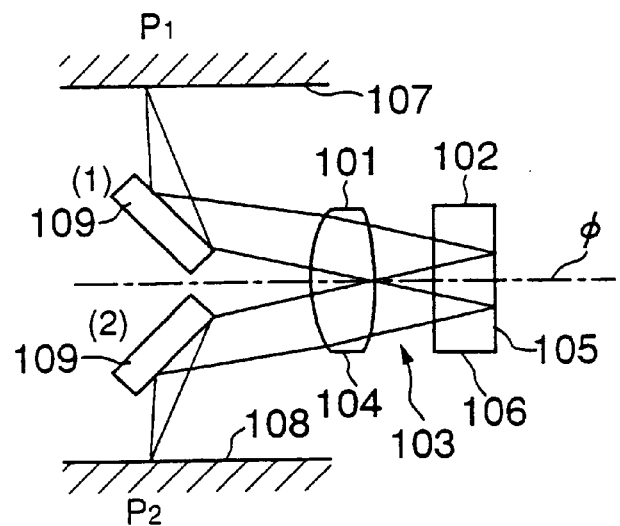
PRIOR ART FIG.2
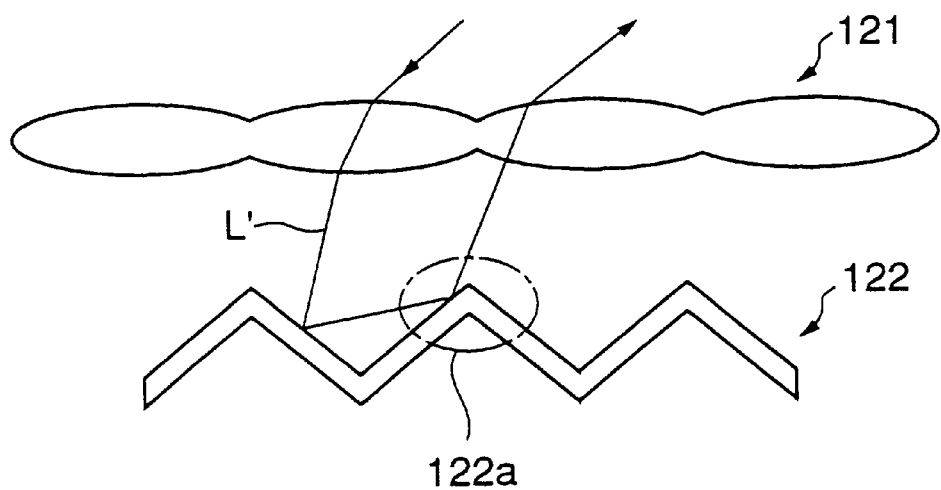

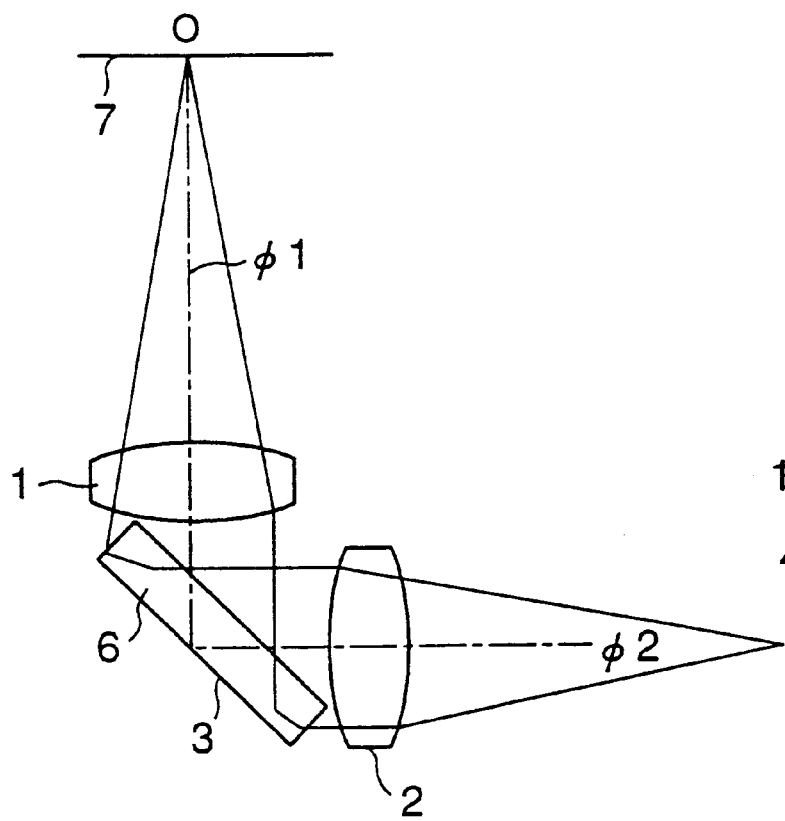
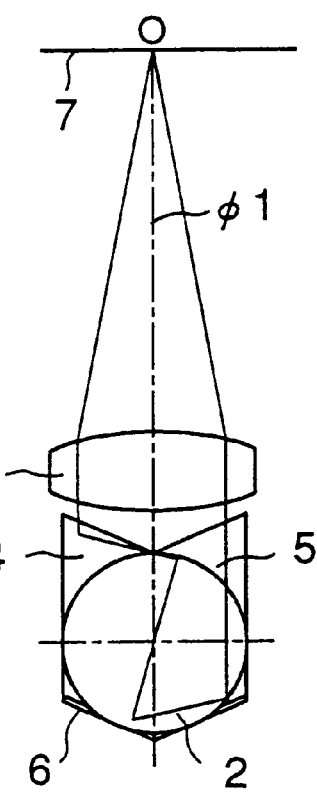
FIG.5A
FIG.5B

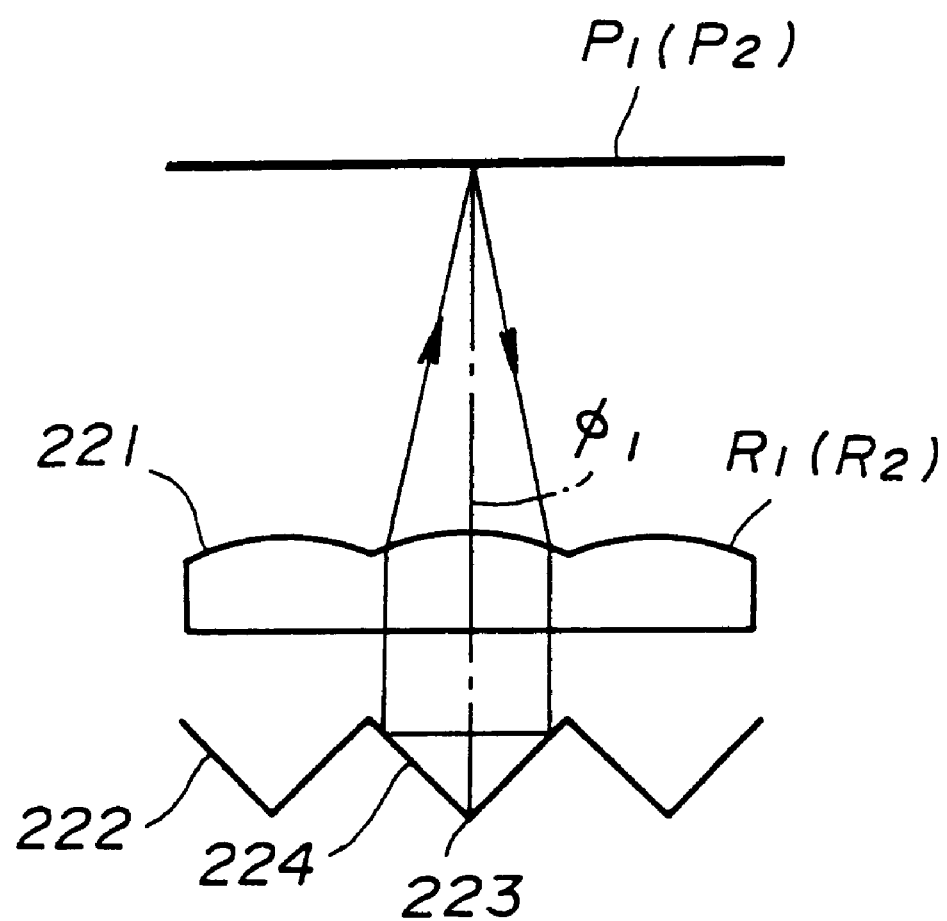

PRIOR ART FIG. 31A
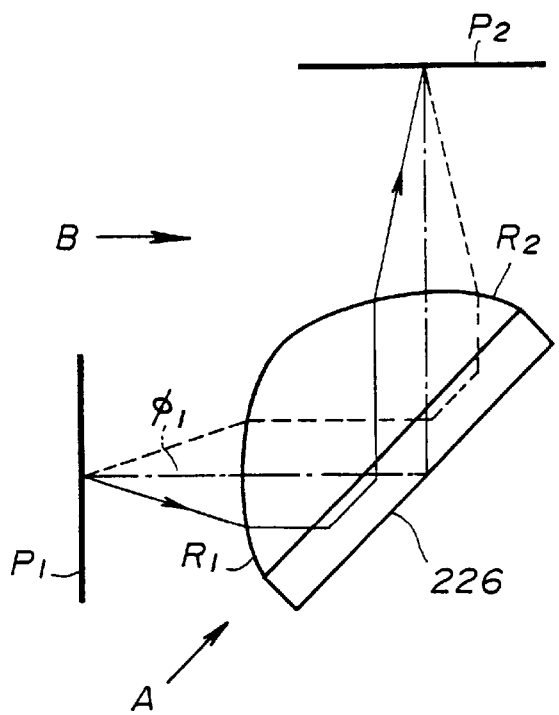
FIG. 31B
PRIOR ART
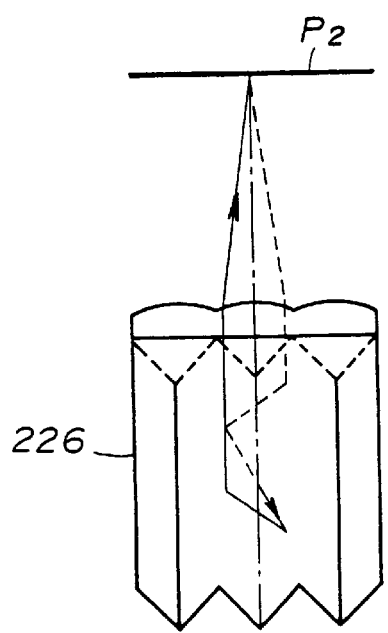
FIG. 31C
PRIOR ART
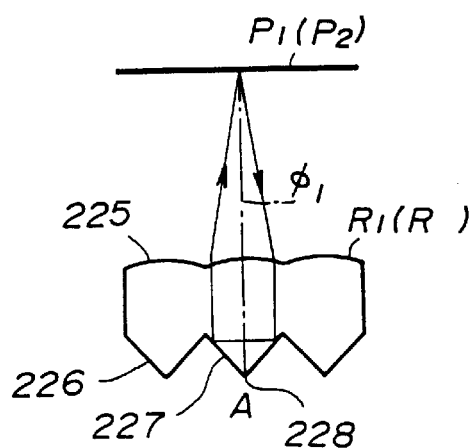

IMAGING DEVICE

BACKGROUND OF THE INVENTION

1. Field of the Invention

The present invention generally relates to an imaging device, and more particularly to an imaging device which is applicable to reading optical systems of copy machines, facsimile machines and the like, an optical system of a reading scanner having a CCD sensor and a equimagnification sensor and optical systems of an optical printing head and a self-scanning type optical printing head.

2. Description of the related Art

In the recent years, it is required to miniaturize optical equipment, such as a copy machine and an optical printer head. To satisfy this requirement, a reading optical system and/or a writing optical system of the optical equipment have to be miniaturized. Thus, an equimagnification imaging optical system in which a distance between an object and an image can be strongly reduced is under investigation. The equimagnification imaging optical system is defined as an optical system which forms an image having the same size as an object.

A description will now be given of an example of the equimagnification imaging optical system having a conventional configuration. FIG. 1 illustrates the equimagnification imaging optical system having a conventional configuration. Referring to FIG. 1, a roof mirror lens array 103 is formed as the equimagnification imaging optical system. The roof mirror lens array 103 has a lens array 101 and a roof mirror array 102. The lens array 101 is formed of a plurality of lenses 104 which are arranged in line perpendicular to a a drawing plane of FIG. 1. the lenses 104 are optically equivalent to each other. The roof mirror array 102 is formed of a plurality of roof mirrors 106. The roof mirrors 106 are arranged in line so that each of the roof mirrors 106 faces one of the lenses 104. Each of the roof mirrors 106 has a ridge line 105. The ridge line 105 is perpendicular to a direction in which the roof mirrors 106 are arranged and an optical axis of each of the lenses 104. A stop member (not shown) is provided between the lens array 101 and the roof mirror array 102 so that imaging systems, each of which is formed of one of the lenses 104 and a corresponding one of the roof mirrors 106, are separated from each other.

A reading position P1 of an original 107 is set at a position which is not on the optical axis of each of the lenses 104 and corresponds to a finite slit height position. Light reflected from the reading position P1 of the original 107 passes through the each of the lenses 104 so that the light formed of parallel rays. The parallel rays travels to a corresponding one of the roof mirrors 106 and are reflected by the corresponding one of the roof mirrors 106 in the same direction. The light reflected by each of the roof mirrors 106 travels through a corresponding one of the lenses 104 again and is then focused on an imaging position P2 which is optically conjugate to the reading position P1. The position P2 is, for example, on a surface of a CCD sensor 108.

An prism lens array is disclosed in Japanese Patent Publication No.61-2929. Into this inprism lens array, a lens array and a roof mirror lens array are integrated. In the same manner as the roof mirror lens described above, a reading position is set at a position corresponding to a finite slit height position. The light reflected at the reading position travels through each of lenses and is then reflected by each of roof prisms twice. The light reflected by the each of the roof prisms travels through a corresponding one of the lenses again and is focused on an imaging position which is optically conjugate to the reading position.

A roof mirror lens array which is the equimagnification imaging optical system is disclosed in Japanese Laid-Open Patent Application No.57-37326. Into this roof mirror lens array, a lens array, a roof mirror array and a stop member are integrated the lens array has lenses which are optically equivalent to each other. The lenses are arranged in line. The roof mirror array has roof mirrors. Each of the roof mirrors faces one of the lenses and has a ridge line. The ridge line is perpendicular to a direction in which the lenses are arranged and to an optical axis of each of the lenses. The stop member is provided between the lens array and the roof mirror array to separate imaging optical systems each of which is formed of a corresponding one of the lenses and a corresponding one of the roof mirrors. The roof mirror lens array may be used to read images and for exposure of a photosensitive member.

In each of the imaging devices as described above, a single imaging system is formed of a lens of the lens array and a roof mirror of the roof mirror array. An aperture of the stop member is provided between corresponding lens and roof mirror to optically separate the imaging system from adjacent imaging systems. In this type of the imaging device, the light travels and returns through the lens. Thus, it is not possible to locate the reading position and the imaging position at the same position. The light rays travels along the optical axis are separated to an object (the original) side rays and imaging point side rays. Thus, the reading position and the imaging position have to be set based on a finite slit height position. That is, the reading position P1 is set at a finite height position in a direction parallel to the ridge line 105 of each of the roof mirrors 106. The imaging position P2 is set at the finite height position in the reverse direction.

Since the amount of separation of the light rays is limited, separation mirrors 109(1) and 109(2) are used to set the reading position P1 and the imaging position P2 as shown in FIG. 1. The light traveling from the reading position P1 is reflected by the separation mirror 109(1) and travels to a corresponding one of the lenses 104. The light passing through each of the lenses 104 is reflected by the separation mirror 109(2) and focused on the imaging position. Each of the separation mirrors 109(1) and 109(2) is a rectangular plane mirror which expands in a direction perpendicular to the drawing plane of FIG. 1. Each of the separation mirrors 109(1) and 109(2) are arranged so as to be inclined by 45° with respect to a plane including optical axes φ of the lenses 104 of the lens array 101.

In the conventional imaging device having a roof mirror lens or a roof mirror lens array, the light passes through the same lens 104 twice, and the reading position P1 (a reading plane) and the imaging position P2 (an imaging plane) are located in the opposite sides with respect to the optical axis φ of the lens 104. The separation mirrors 109(1) and 109(2) are provided in optical paths between the reading position P1 and the lens 104 and between the lens 104 and the imaging position P2.

The surfaces of each roof mirror and the separation mirrors 109(1) and 109(2) are provided with reflecting films which are formed of high reflecting material, such as aluminum (Al), by a vacuum evaporation process. The reflectivity of each of the reflecting films is about 90%. In the imaging device having the above structure as shown in FIG. 1, there are two reflecting surfaces of each of the roof mirrors 106 and two reflecting surfaces of the respective separation mirrors 109(1) and 109(2). Thus, the total reflectivity of is about 66%. The loss of the amount of light in the imaging device is large. In addition, in the conventional case, the light pass through the same lens 104 twice, so that the reading position P1 and the imaging position P2 have to be adjacent and to be symmetrical to each other with respect to the optical axis φ. Thus, stray light, such as reflected light from the surface of the lens 104 and from surfaces other than the reflecting surface of the roof mirror 106, may be incident on the imaging position P2 at a high possibility. Such stray light affects characteristics of optical images. In general, the contrast and the resolution of the optical images deteriorate.

Further, FIG. 2 illustrates an essential part of another example of the conventional imaging device. Referring to FIG. 2, the imaging device has a lens array 121 and a roof mirror array 122. Each of roof mirrors of the roof mirror array 122 has a ridge line portion 122a between arranged optical axes. A roof mirror lens array is formed of the lens array 121 and the roof mirror array 122.

Each of the roof mirrors of the roof mirror array 122 has two reflecting surfaces which are connected to each other at an angle of 90° so that the ride line portion 122a is formed. However, light L' which is obliquely incident on each lens of the lens array 121 is reflected by a corresponding one of the roof mirrors twice and then ejected from an adjacent lens. That is, the light L' obliquely incident on an optical system is ejected from an adjacent optical system in the imaging device.

In addition, an example of a conventional imaging device using a roof mirror lens array is shown in FIG. 30. In the imaging device, a lens array and a roof mirror array are integrated. Referring to FIG. 30, the imaging device has a lens array 221 and a roof mirror array 222. In the roof mirror array 222, a ridge line portion 223 is in a boundary between reflection surfaces 224. The lens array 221 has lenses R1 (R2) each of which has an optical axis φ1.

In the imaging device having the above structure, for example, light from an original passes through the lens RI and is reflected twice by the reflection surfaces 224 of the roof mirror array 222. The reflected light then passes through the lens R1 (R2) of the lens array 221 and is projected onto an imaging surface so that an equimagnification erect image of the original is formed.

Further, another conventional imaging device has been proposed in Japanese Patent Publication No.5-35245. The proposed imaging device is shown in FIGS. 31A, 31B and 31C. The imaging device is referred to as a roof prism lens array imaging device. FIG. 31A is a side view of the roof prism lens array imaging device, FIG. 31B is a view thereof from a direction B shown in FIG. 31A and FIG. 31C is a view thereof from a direction A shown in FIG. 31A. Referring to FIGS. 31A, 31B and 31C, the imaging device has a roof prism lens array 226. In the roof prism lens array 226, a ridge line portion 228 is in a boundary between reflection surfaces 227.

In the imaging device having such a structure, the light from an original (P1) passes through the lens RI and is reflected twice by the reflection surfaces 227. The reflected light is then emitted from the lens R2 and projected onto an imaging surface P2 so that an equimagnification erect image of the original is formed.

In addition, Japanese Laid-Open Patent Application No.7-35998 discloses an imaging device having a roof mirror lens array which is an equimagnification imaging system. In the imaging device, two or more roof mirrors are provided with respect to each of lenses of the lens array. FIG. 32 shows such an imaging device. The roof mirror array is arranged so that a valley of the roof mirror array is located at a center between optical axes of lenses of the lens array. In the imaging device shown in FIG. 32, when light L1 is incident on a reflection surface of the roof mirror array close to an adjacent part, the reflected light of the incident light L1 is emitted as ghost light from the lens array.

FIGS. 33A and 33B illustrates a state in which cross-talk light is generated in a conventional equimagnification imaging system. FIG. 33A shows an example in which light L1 is incident on the device obliquely and is reflected once by a prism or a roof mirror, so that cross-talk light is generated. FIG. 33B shows an example in which light L1 is reflected twice by reflection surfaces and emitted from a lens other than a Elens from which the light should be emitted, so that an image is formed by cross-talk light at a position other than a position at which an image should be formed.

In such imaging devices, if light from an original is incident on an objective lens at the front thereof, an image is correctly formed on an imaging surface. However, as shown in FIG. 33A, in a case where the light L1 is incident on the device obliquely, the light L1 passes through the lens R and is reflected once by a reflection surface of the roof prism or the roof mirror and emitted from the device. As a result, ghost light is generated. In addition, as shown in FIG. 33B, the light L2 is reflected twice by the reflection surfaces and emitted from a lens adjacent to a lens from which the light L2 should be emitted. As a result, the cross-talk light is generated.

Further, FIG. 34 shows an example of a roof prism lens array imaging device. The roof prism lens array imaging device has a roof prism lens. A ridge line portion 111 is in a boundary between reflection surfaces 112. A groove 113 is formed between reflection surfaces (Dach surfaces). Due to the groove 113, stray light can be prevented from generating in the device.

However, if the light is incident on the lens surface obliquely, the light is reflected by a boundary between the groove 113 and the surface of the prism. The light is further reflected twice by the reflection surfaces 112 and is emitted from the lens R, so that the cross-talk light is generated.

As has been described above, in the conventional equimagnification imaging device, the cross-talk light and the ghost light can not be prevented, so that the quality of an image, the contrast and the resolution deteriorate.

Thus, an equimagnification imaging device in which an aperture member is provided in the inside or the outside of the lens has been proposed. In such an imaging device, an angle range in which the light can be incident on the device and emitted from the device is limited by the aperture member. As a result, the cross-talk light and the ghost light can be reduced.

FIGS. 35A and 35B show such an equimagnification imaging device. As shown in FIG. 35A, in a roof prism or roof mirror array imaging device, an aperture member 120 prevents the light from being incident on the lens at an angle equal to or greater than a constant angle so as to prevent the cross-talk light or the ghost light from being generated.

However, in order to perfectly prevent the stray light, such as the cross-talk light or the ghost light, from being generated, each aperture on the aperture member has to be narrowed down. If each aperture is narrowed down, the light incident on the lens at the front is also limited, so that the light is not efficiently used to form an image.

In the conventional case disclosed in Japanese Patent Publication No.61-2929 described above, an image equimagnified in a direction in which lenses are arranged and a direction perpendicular to the direction in which the lenses are arranged is formed. However, in an actual line sensor having the conventional imaging device, the size of each photo element in a sub-scanning direction perpendicular to the direction in which the photo elements are arranged differs from (are greater than) the size of each photo element in the direction in which the photo elements are arranged.

Thus, in the conventional equimagnification imaging device, while the sensor unit is being moved in the sub-scanning direction, physical positions in a reading line are varied. As a result, the resolution in the sub-scanning direction deteriorates.

In addition, in the conventional case as shown in FIG. 2, when light is incident on a surface of the lens array obliquely, there is stray light between the lens array and the roof mirror array. The stray light appears on an imaging surface as ghost light or flare. As a result, an indistinct image is formed on the imaging surface.

To solve this problem, a lens array device as shown in FIG. 36 has been proposed (Japanese Laid-Open Patent Application No.5-53245). The lens array device has objective lenses, Dach surfaces and image side lenses has been proposed. A groove is formed between Dach surfaces to shade light.

However, the light incident on a boundary between the groove and the surface of the lens obliquely appears as ghost light on the imaging surface. Light reflected by the one side of the roof prism generates flare. Thus, the image formed on the imaging surface is indistinct.

SUMMARY OF THE INVENTION

Accordingly, a general object of the present invention is to provide a novel and useful imaging device in which the disadvantages of the aforementioned prior art are eliminated.

A specific object of the present invention is to provide an imaging device in which no separation mirror is needed and a degree of freedom of layout of the imaging position and a degree of freedom of optical design can be improved.

Another object of the present invention is to an imaging device in which it is hard to be affected by the stray light and the loss of the amount of light is small.

The above objects of the present invention are achieved by an imaging device comprising: a first focusing element on which rays from an object are incident; a second focusing element from which the rays are emitted toward an imaging surface; and a roof mirror having surfaces which are connected to each other at an angle of 90° so that a ridge line is formed, the roof mirror being arranged so that the ridge line intersects optical axes of the first focusing element and the second focusing element at a position on a plane including the optical axes.

According to the present invention, the stray light can be substantially prevented from affecting images and the loss of the amount of light in the imaging device can be reduced.

A roof prism may be substituted for the roof mirror.

A first focusing element array, a second focusing element array and a roof mirror array may be respectively substituted for the first focusing element, the second focusing element and the roof mirror.

A roof prism lens array having roof lenses each of which has a first focusing element portion, a second focusing element and a roof prism portion may be substituted for the first focusing element, the second focusing element and the roof mirror.

Another object of the present invention is to provide an imaging device in which light incident on an imaging optical system does not almost affect an adjacent imaging optical system.

The object of the present invention is achieve by an imaging device comprising: a focusing element array having focusing elements which are optically equivalent and arranged in line; a roof mirror array having roof mirrors which are optically equivalent and arranged in line so as to correspond to the focusing elements of the focusing element array, the focusing element array and the roof mirror array being arranged so that an optical axis of each of the focusing elements intersects a ridge line of a corresponding one of the roof mirrors; and a regular reflection preventive structure provided in at least some of ridge line portions, between arranged optical axes, of the roof mirrors of the roof mirror array, the regular reflection preventive structure reducing an amount of light which is incident on a focusing element, reflected by a corresponding roof mirror and emitted from an optical system adjacent to the focusing element.

According to the present invention, incident on an imaging optical system does not almost affect an adjacent imaging optical system.

In addition, an object of the present invention is to provide an imaging device having an aperture member on which apertures, each having improved shape, are formed so that the light can be efficiently used to form an image.

The object of the present invention is achieved by an imaging device comprising: a lens array in which lenses are arranged in a line, the lenses being optically equivalent; a roof mirror array having roof mirrors arranged in a line parallel to a direction in which axes of the lenses of the lens array are arranged; and an aperture member having apertures arranged so as to correspond to the lenses of the lens array, wherein a center of an interval between axes of adjacent lenses of the lens array corresponds to a ridge line of the roof mirror array, and wherein at least two roof mirrors are provided with respect to each of the lenses of the lens array.

According to the above imaging device, each of the apertures can be widened. In addition, the amount of crosstalk light can be reduced so that the incident light can be efficiently used to form an image. Further, sine each of the apertures can be widened, the field angle can be increased.

The above object of the present invention is also achieved by an imaging device comprising: a lens array in which lenses are arranged in a line, the lenses being optically equivalent; a roof prism array having prisms arranged in a line parallel to a direction in which axes of the lenses of the lens array are arranged, the roof prism array being integrated with the lens array and made of the same material as the lens array; and an aperture member having apertures arranged so as to correspond to the lenses of the lens array, wherein a center of an interval between axes of adjacent lenses of the lens array corresponds to a ridge line of the roof prism array, and wherein at least two roof prisms are provided with respect to each of the lenses of the lens array.

According to the above imaging device, in addition to the above merits, since the roof prism array and the lens array are integrated with each other, the number of parts of the imaging device and the production cost can be reduced.

The above object of the present invention is also achieved by an imaging device comprising: a first lens array, which should be located in an incident side, having optically equivalent lenses arranged in a line; a second lens array, which should be located in an image side and is optically equivalent to the first lens array, having lenses arranged so that each of optical axes is perpendicular to an optical axis of a corresponding one of the lenses of the first lens array; a roof mirror array located so that each ridge line is perpendicular to a direction in which the first and second lens arrays are arranged and inclined at 45° with respect a plane including optical axes of the lenses of the first and second lens array; and an aperture member having apertures arranged so as to correspond to the lenses of the first and second lens arrays, wherein a center of interval between axes of adjacent lenses of each of the first and second lens arrays corresponds to a ridge line of the roof mirror array, and wherein at least two roof mirrors are provided with respect to each of the lenses of each of the first and second lens arrays.

In addition, the above object of the present invention is achieved by an imaging device comprising: a first lens array, which should be located in an incident side, having optically equivalent lenses arranged in a line; a second lens array, which should be located in an image side and is optically equivalent to the first lens array, having lenses arranged so that each of optical axes is perpendicular to an optical axis of a corresponding one of the lenses of the first lens array; a roof prism array located so that each ridge line is perpendicular to a direction in which the first and second lens arrays are arranged and inclined at 45° with respect a plane including optical axes of the lenses of the first and second lens array, the roof prism array being integrated with the first and second lens arrays and made of the same material as the first and second lens arrays; and an aperture member having apertures arranged so as to correspond to the lenses of the first and second lens arrays, wherein a center of interval between axes of adjacent lenses of each of the first and second lens arrays corresponds to a ridge line of the roof prism array, and wherein at least two roof prisms are provided with respect to each of the lenses of each of the first and second lens arrays.

According to the above imaging devices, a lens arrays crossing layout type imaging device having the above merits can be obtained.

Another object of the present invention is to provide an imaging device by which the solution in the sub-scanning direction can be improved.

Further, an object of the present invention is to provide an imaging device having a lens array which can be easily made.

The above objects of the present invention are achieved by an imaging device comprising: a condensing element array having elements each of which condenses light in only an arranging direction in which the elements are arranged; a condensing element which condenses light in a direction perpendicular to the arranging direction; and a roof mirror array having mirrors arranged at the same intervals as the elements of the condensing element array.

According to the above imaging device, an image which is enlarged in only the sub-scanning direction can be formed. Thus, the resolution in the sub-scanning direction can be improved. In addition, since the two sets of lens arrays used in the conventional device are not needed and only one set of lens array is used, a process for adjusting two optical axes of the two sets of lens arrays is not needed. Thus, the imaging device can be easily made.

The above object of the present invention is also achieved by imaging device comprising: a condensing element array having elements each of which condenses light in only an arranging direction in which the elements are arranged; a condensing element which condenses light in a direction perpendicular to the arranging direction; and a roof prism array having prisms arranged at the same intervals as the elements of the condensing element array.

According to the above imaging device, in addition to the above merits, since the roof prism array is used, the evaporation coating is not needed to form on each reflection surface. Thus, the productivity of the imaging device can be improved and the production cost can be reduced.

The above object of the present invention is also achieved by an imaging device comprising: a condensing element array having elements each of which condenses light in only an arranging direction in which the elements are arranged; a condensing element which condenses light in a direction perpendicular to the arranging direction; a roof mirror array having ridge lines which are perpendicular to the arranging direction and arranged at the same intervals as the elements of the condensing element array; and an aperture member having apertures arranged so as to correspond to the elements of the condensing element array, wherein a groove is formed in each boundary portion between adjacent roof mirrors of the roof mirror array.

According to the above imaging device, further, the flare light and ghost light can be reduced by the groove formed between the roof mirrors of the roof mirror array.

Above object of the present invention is also achieved by an imaging device comprising: a condensing element array having elements each of which condenses light in only an arranging direction in which the elements are arranged; a condensing element which condenses light in a direction perpendicular to the arranging direction; a roof prism array having ridge lines which are perpendicular to the arranging direction and arranged at the same intervals as the elements of the condensing element array; and an aperture member having apertures arranged so as to correspond to the elements of the condensing element array, wherein a projection portion is formed in each boundary portion between adjacent roof prisms of the roof prism array.

According to the above imaging device, further, the flare light and ghost light can be reduced by the projection portion formed between the roof prisms of the roof prism array.

BRIEF DESCRIPTION OF THE DRAWINGS

Other objects, features and advantages of the present invention will be apparent from the following description when read in conjunction with the accompanying drawings, in which:

FIG. 1 is a diagram illustrating an example of a conventional imaging device;

FIG. 2 is a diagram illustrating another example of the conventional imaging device;

FIGS. 5A and 5B are diagrams illustrating a structure of the imaging device according to a second embodiment of the present invention;

FIGS. 30, 31A, 31B, 31C, 32, 33A, 33B, 34, 35A, 35B and 36 are diagrams illustrating examples of a conventional imaging device;

DESCRIPTION OF THE PREFERRED EMBODIMENTS

A description will now be given of embodiments of the present invention.

Figure 3A:
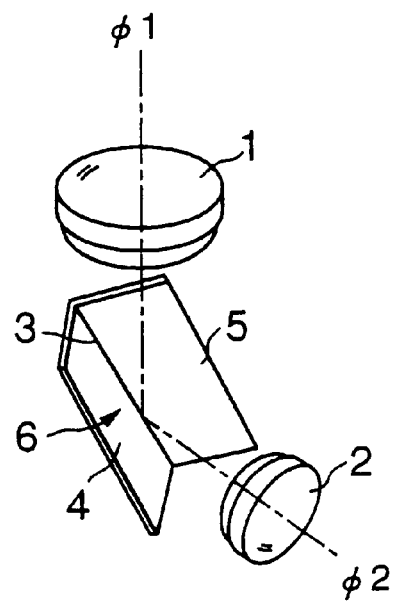
FIGS. 3A and 3B are diagrams illustrating a structure of an imaging device according to a first embodiment of the present invention.
Figure 3B:
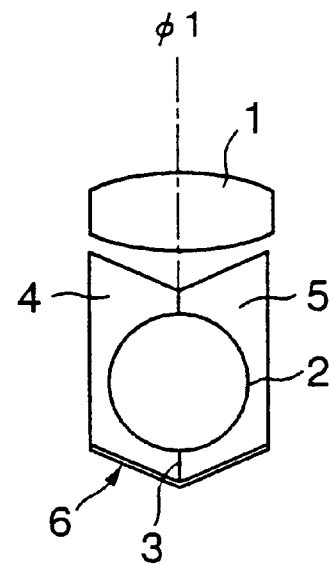

An imaging device according to a first embodiment of the present invention is formed as shown in FIGS. 3A and 3B. Referring to FIGS. 3A and 3B, the imaging device has a first focusing element 1, a second focusing element 2 and a roof mirror 6. The roof mirror 6 has a ridge line 3.

The imaging device is used in an image reading system of an image forming apparatus such as a facsimile machine. The roof mirror 6 is formed of surfaces 4 and 5 which are connected to each other at an angle of 90 so that the ride line 3 is formed. The focusing characteristic of the first focusing element 1 differs from that of the second focusing element 2 (not optically equivalent). The first and second focusing elements 1 and 2 are arranged so that an optical axis φ1 of the first focusing element 1 is perpendicular to an optical axis φ2 of the second focusing element 2. The roof mirror 6 is arranged so that the ridge line 3 is on a plane including the optical axes φ1 and φ2, intersects the optical axes φ1 and φ2 and is inclined at an angle of 45° with respect to the optical axes φ1 and φ2.

In order to use the imaging device having the above structure as the reading optical system, the first focusing element 1 faces a surface of an original and the focusing element 2 faces an imaging surface, such as a surface of a CCD line sensor. That is, a normal line of the surface of the original and a normal line of the imaging surface are perpendicular to each other (90 ).

A description will now be given, with reference to FIG. 4, of an imaging operation of the imaging device described above.

Figure 4:
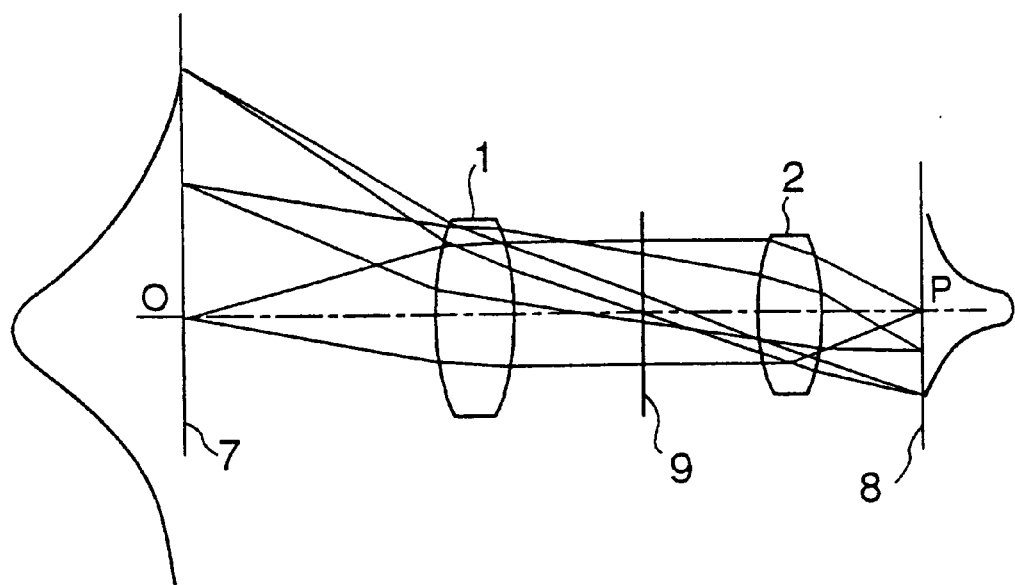
FIG. 4 is a diagram illustrating optical paths in a optical system optically equivalent to the imaging device shown in FIGS. 3A and 3B.

FIG. 4 shows optical paths in an optical system which is optical equivalent to the imaging device shown in FIGS. 3A and 3B. Referring to FIG. 4, the first focusing element 1 faces a surface 7 of an original, and the second focusing element 2 faces an imaging surface 8. Information is located at a position (a reading position O) of the surface 7 of the original, and an imaging position P corresponding to the reading position O is located on the imaging surface 8. An imaginary surface 9 is set between the first and second focusing elements 1 and 2. The imaginary surface 9 corresponds to a plane including the ridge line of the roof mirror 6.

The first focusing element 1 makes rays from the reading position O on the surface 7 of the original be in parallel. The parallel rays from the first focusing element 1 travels through the imaginary surface 9 and are then focused at the imaging position P of the imaging surface 8 by the second focusing element 2. As a result, an image corresponding to the information on the original is formed at the imaging position P.

In the imaging device as described above, the roof mirror 6 has functions corresponding to the separation mirrors 109(1) and 109(2) of the conventional imaging device (see FIG. 1). Further, the second focusing element 2 which can form the imaging point P is provided apart from the first focusing element 1. Thus, the layout of the imaging position P corresponding to the reading point O can be freely designed.

Further, the normal line of the surface 7 of the original and the normal line of the imaging surface 8 are perpendicular to each other, so that the stray light is hardly incident on the imaging position P. That is, the imaging device is not substantially affected by the stray light. The rays are not strongly separated from the optical axes φ1 and φ2, so that the loss of the amount of light can be reduced.

In the second embodiment shown in FIGS. 5A and 5B, the first and the second focusing elements 1 and 2 have the same focusing characteristic so as to be optically equivalent.

In the above embodiments shown in FIGS. 3A, 3B, 5A and 5B, the roof mirror 6 is inclined with respect to the first and second focusing elements 1 and 2 at an angle of 45°. However, the angle can be set another value. If the size of each of the first and second focusing elements 1 and 2 is not limited, the roof mirror 6 can be inclined with respect to the focusing elements 1 and 2 at an angle less than 45°. In addition, in consideration of the layout of the CCD (a photosensitive body in a optical writing system) on which the imaging point P is formed, the angle can be set at a value greater than 45°.

Figure 6A:
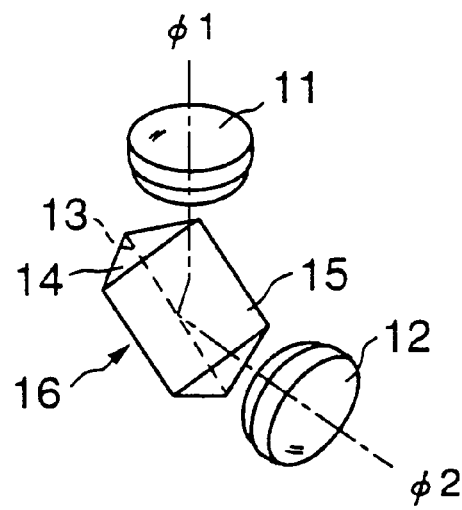
FIG. 6A is a diagram illustrating a structure of the imaging device according to a third embodiment of the present invention.

The imaging device according to the third embodiment is formed as shown in FIG. 6A. Referring to FIG. 6A, the imaging device has a first focusing element 11, a second focusing element 12 and a roof prism 16. The roof prism 16 has a surface 14 and a surface 15 which are connected to each other at an angle of 90 so that a ridge line 13 is formed.

This type of the imaging device may be also used in the reading optical system of the facsimile machine. The first focusing element 11 and the second focusing element 12 have the same focusing characteristic so as to be optically equivalent. The first and second focusing elements 11 and 12 are arranged so that the optical axes φ1 and φ2 of the focusing elements 11 and 12 are perpendicular to each other. The roof prism 16 is arranged so that the ridge line 13 is on a plane including the optical axes φ1 and φ, intersects the optical axes φ1 and φ2 and is inclined at a predetermined angle with respect to the optical axes φ1 and φ2.

The rays which are made be in parallel by the first focusing element 11 are reflected by the surfaces 14 and 15 of the roof prism 16 twice, and is then incident on the second focusing element 12. The rays which are in parallel are focused on an imaging position by the second focusing element 12.

Thus, the imaging device in this embodiment (the third embodiment) can obtain the same advantages as that in the first embodiment as described above.

In a case where the roof prism 16 is made of normal glass, the refractive index is about 1.54 (n=1.54) in a visible region. If the rays are incident on the roof prism 16 under a critical condition (an incident angle θ=1/n; 40.5 in this case), the rays are in a total reflection state in the roof prism 16. In this case, the amount of light can be more effectively used than in the conventional case using mirrors on which aluminum films are formed by evaporation.

Figure 6B:
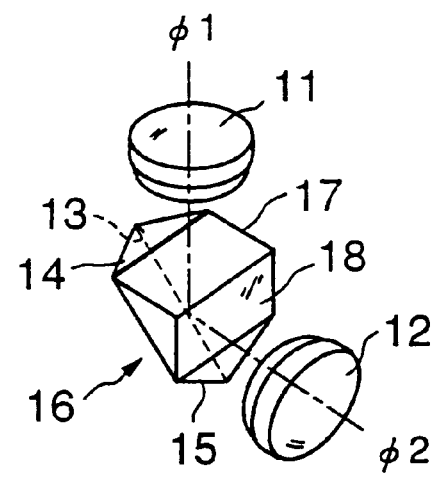
FIG. 6B is a diagram illustrating a modification of the imaging device shown in FIG. 6A.

FIG. 6B shows a modification of the imaging device show in FIG. 6A. The roof prism 16 has further surfaces 17 and 18. A normal line of the surface 17 is parallel to the optical axis φ1 of the first focusing element 1. A normal line of the surface 18 is parallel to the optical axis φ2 of the second focusing element 12. The rays from the reading position is incident on the surface 17 and the rays emitted through the surface 18 travels toward the imaging position.

Figure 6C:
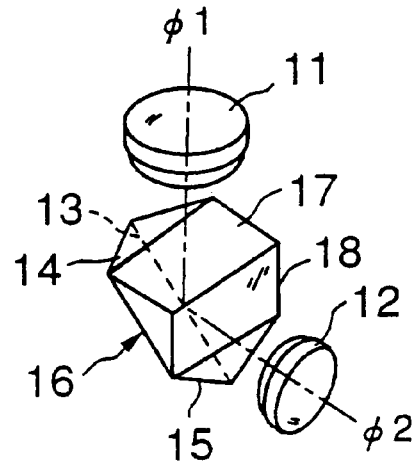
FIG. 6C is a diagram illustrating a modification of the imaging device shown in FIG. 6B.

FIG. 6C shows a modification of the imaging device shown in FIG. 6B. In this modification, the focusing characteristic of the first focusing element 11 differs from that of the second focusing element 12. For example, the focusing power of the second focusing element 12 is increased so that the focal length of the second focusing element 12 is shortened. As a result, the CCD sensor or the photosensitive body on which the imaging position is formed can be close to the imaging device. Thus, the optical reading system or the optical writing system using this type of the imaging device can be miniaturized.

Figure 7:
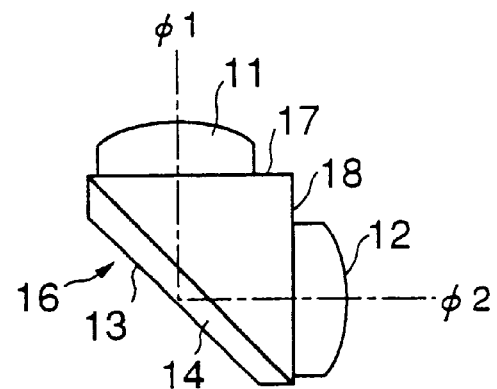
FIG. 7 is a diagram illustrating a structure of the imaging device according to a fourth embodiment of the present invention.

The imaging device according to the forth embodiment of the present invention is formed as shown in FIG. 7. In FIG. 7, those parts which have the same functions as those shown in FIGS. 3A through 6C are given the same reference numbers.

Referring to FIG. 7, the roof prism 16 having the surfaces 17 and 18 is used. The first and second focusing elements 11 and 12 are integrated with the roof prism 16. The first and second focusing element 11 and 12 and the roof prism 16 simultaneously may be made of glass so that the first and second focusing elements 11 and 12 are respectively formed on the surfaces 17 and 18. The first and second focusing element 11 and 12 may be also respectively adhered to the surfaces 17 and 18.

According to this type of the imaging device, the number of boundary surfaces is reduced, the amount of reflection loss of the rays which are reflected by the boundary surfaces can be reduces.

Figure 8:
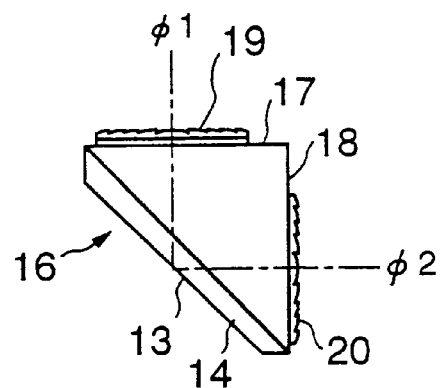
FIG. 8 is a diagram illustrating a structure of the imaging device according to a fifth embodiment of t he present invention.

The imaging device according to the fifth embodiment of the present invention is formed as shown in FIG. 8. In FIG. 8, those parts which have the same functions as those shown in FIGS. 3A through 7 are given the same reference numbers.

Referring to FIG. 8, Fresnel lenses 19 and 20 are integrated with the roof prism 16. The Fresnel lenses 19 and 20 and the roof prism 16 may be made of glass so that the Fresnel lenses 19 and 20 are respectively formed on the surfaces 17 and 18. The Fresnel lenses 19 and 20 which are shaped in plate may be also respectively adhered to the surface 17 and 18.

Figure 9:
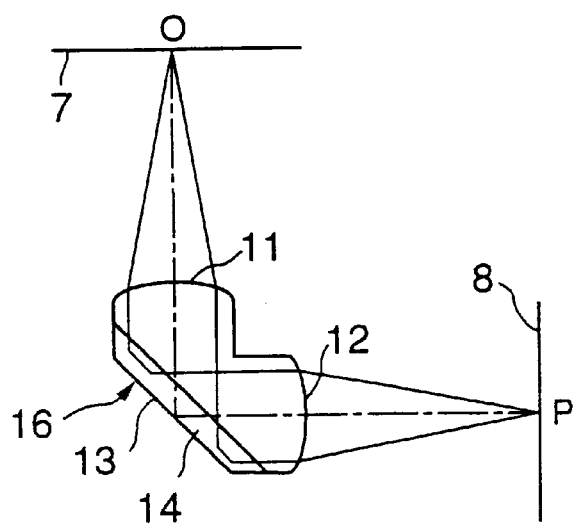
FIG. 9 is a diagram illustrating a structure of the imaging device according to a sixth embodiment of the present invention.

The imaging device according to the sixth embodiment of the present invention is formed as shown in FIG. 9. In FIG. 9, those parts which have the same functions as those shown in FIGS. 3A through 8 are given the same reference numbers.

Referring to FIG. 9, the roof prism 16 are made so that the surfaces 11 and 12 having the functions of the first and the second focusing elements 11 and 12 are formed in a single solid body.

Figure 10A:
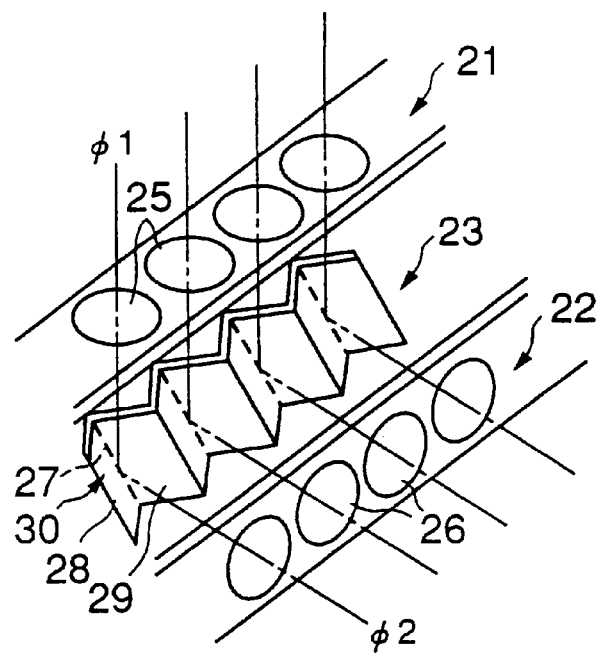
FIGS. 10A, 10B and 10C are diagrams illustrating a structure of the imaging device according to a seventh embodiment of the present invention.
Figure 10B:
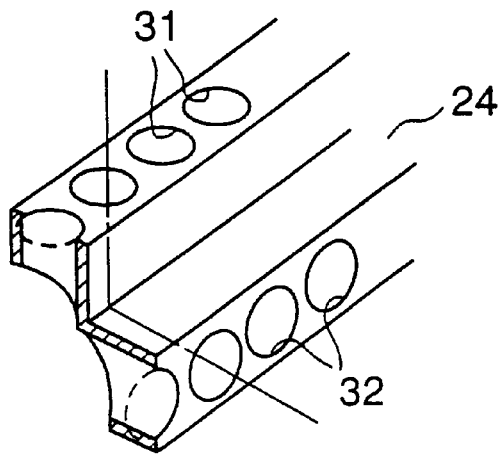
Figure 10C:
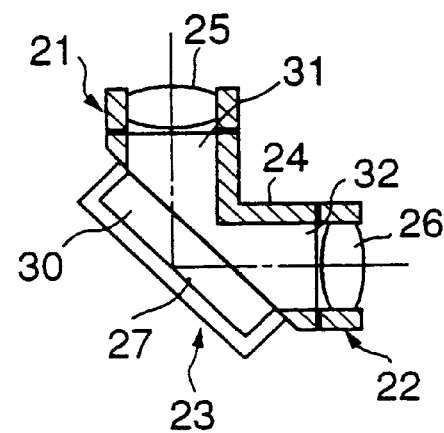

The imaging device according to the seventh embodiment of the present invention is formed as shown in FIGS. 10A, 10B and 10C. This type of the imaging device may be used as the equimagnification imaging device in the reading system of a facsimile machine.

Referring to FIG. 10A, the imaging device has a first focusing element array 21, a second focusing element array 22, a roof mirror array 23 and an aperture block 24. The rays from a reading surface are incident on the first focusing element array 21. The rays emitted from the second focusing element array 22 travels towards the imaging surface. The roof mirror array 23 is located between the first focusing element array 21 and the second focusing element array 22. The aperture block 24 is located among the first focusing element array 21, the second focusing element array 22 and the roof mirror array 23. The aperture block 24 formed as shown in FIG. 10B is used as a stop member.

The first focusing element array 21 is formed of focusing elements 25 which are optically equivalent and arranged in line at constant intervals. The second focusing element array 22 is, in the same manner as the first focusing element array 21, formed of focusing elements 26 which are optically equivalent and arranged in line at the constant intervals. The roof mirror array 23 is formed of roof mirrors 30. Each of the roof mirrors 30 corresponds to a pair of one of the focusing elements 25 of the first focusing element array 21 and one of the focusing elements 26 of the second focusing element array 22. Each of the roof mirrors 30 is formed of surfaces 28 and 29 which are connected to each other at an angle of 90 so that a ridge line 27 is formed. The ridge line 27 of each of the roof mirrors 30 is located at a position at which an optical axis of a corresponding one of the focusing elements 25 and an optical axis of a corresponding one of the focusing elements 26 intersect each other. The roof mirror array 23 is inclined at an angle of 450 with respect to the first and second focusing element arrays 21 and 22. That is, the relationship among each of the roof mirrors 30, a corresponding one of the focusing elements 25 and a corresponding one of the focusing elements 26 is identical to that of the first and second focusing elements 1 and 2 and the roof mirror 6. The aperture block 24 prevents the cross talk between adjacent focusing elements 25 and between adjacent focusing elements 26 so that the resolution and the amount of light traveling the focusing elements 25 and 26 are optimized. In the aperture block 30, pairs of aperture 31 and 32 are arranged in line at the same intervals as the focusing elements 25 and 26 of the first and second focusing element array 21 and 22.

In the imaging device having the structure as described above, the optical axis of each of the focusing elements 25 is on a plane which includes the ridge line 27 of a corresponding one of the roof mirrors 30 and is perpendicular to a direction in which the focusing elements 25 are arranged. The light from a surface of an original is made be parallel light by the focusing elements 25. The parallel light is then incident on the roof mirrors 30. The plane light incident on the roof mirrors 30 is reflected by the surfaces 28 and 29 twice in each of the roof mirrors 30. The light incident into each of the roof mirrors 30 is reflected at an angle of 90 and travels to a corresponding one of the focusing elements 26 of the focusing element array 22 as shown in FIG. 10C. The light is focused on the imaging surface by each of the focusing elements 26. Each of the focusing elements 26 has the same focusing functions as each of the focusing elements 25 so that the focusing elements 25 and 26 are optically equivalent. As a result, the imaging surface corresponding to the reading surface can be formed at the optimum position. The light is reflected by each of the roof mirrors 30 twice, an erect image having the same size of an object on the original (the equimagnification) is formed. In this case, effective reading widths of adjacent focusing elements 25 and 26 overlap each other so that a required effective reading width is obtained. Thus, the focal length of each of the focusing elements 25 and 26 can be reduced, so that the imaging device can be miniaturized.

The degree of freedom of layout of the imaging position can be improved in comparison with the conventional case shown in FIG. 1. The light travels along the optical axis $\phi 1$ and $\phi 2$, so that the utilization of the amount of the light can be improved. The separation mirrors 109(1) and 109(2) which are used in the conventional type of the imaging device can be omitted. Although the second focusing element array 22 is needed, the first focusing element array 21 which is optically equivalent to the second focusing element array 22 can be used as the second focusing element array 22. Thus, the kinds of optical parts of the imaging device is not increased. In an actual case, the first and second focusing element arrays 21 and 22, the roof mirror array 23 and the aperture block 24 can be molded into a single solid body. The direction in which the light travels to the roof mirror array 23 is perpendicular to the direction in which the light travels from the roof mirror array 23 toward the imaging surface. Thus, the stray light can be prevented from being incident on the imaging surface. As a result, the stray light does not affect the imaging characteristics, so that the contrast and the resolution of images formed on the imaging surface can be improved.

Figure 11A:
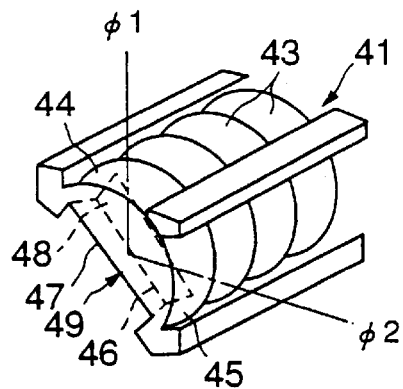
FIGS. 11A, 11B, 11C and 11D are diagrams illustrating a structure the imaging device according to a eighth embodiment of the present invention.

The imaging device according to the eighth embodiment of the present invention is formed as shown in FIG. 11A. This type of imaging device may be used as the equimagnification imaging device.

Figure 11B:
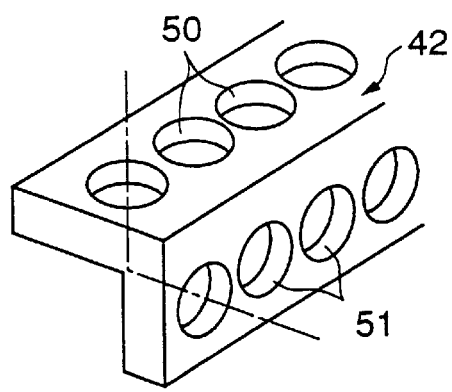

Referring to FIG. 11A, the imaging device has a roof prism lens array 41 and a aperture block 42. The roof prism lens array 41 is formed of roof prism lenses 43 are arranged in line. Each of the roof prism lenses 43 is a minimum unit of an imaging system. Each of the roof prism lenses 43 is formed of an incident-side focusing element 44, an imaging-side focusing element 45 and a roof prism portion 49. The roof prism portion 49 has surfaces 47 and 48 which are connected to each other at an angle of 90 so that a ridge line 46 is formed. The incident-side focusing element 44 and the imaging-side focusing element 45 are optically equivalent to each other. The roof prism portion 49 is located at position at which the axis φ1 of the incident-side focusing element 44 and the axis φ2 of the imaging-side focusing element 45 intersect each other at an angle of 90°. The ridge line 46 is inclined at an angle of 45° with respect to the axes φ1 and φ2. Thus, a direction in which the roof prism lenses 43 of the roof prism lens array 41 are arranged is perpendicular to the ridge line 46 of each of the roof prism lenses 43. The aperture block 42 has apertures 50 and 51, as shown in FIG. 11B, which are respectively arranged in line at the same intervals as the focusing elements 44 and 45.

Figure 11C:
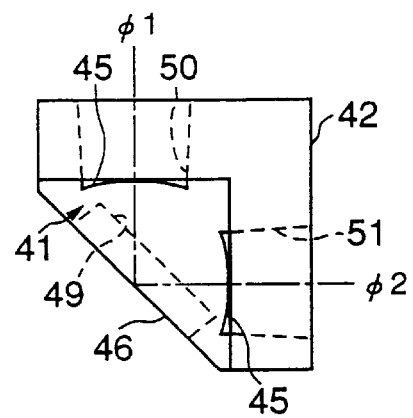

In the imaging device having the structure as described above, the optical axis φ1 of each of the incident-side focusing elements 44 is on a plane which includes the ridge line 46 of the roof prism portion 49 and perpendicular to the direction in which the roof prism lenses 43 are arranged, as shown in FIG. 11C. The incident-side focusing element 44 makes the rays from the original be in parallel, and the rays are then incident on the roof prism portion 49. The rays are reflected in the roof prism portion 49 twice so that the direction in which the rays travel is changed by an angle of 90. The rays are then emitted from the imaging-side focusing element 45. Images are formed on the imaging surface by the imaging-side focusing element 45. Since the imaging-side focusing element 45 is optically equivalent to the incident-side focusing element 44, the relationship between the reading surface and the incident-side focusing element 44 and the relationship between the imaging surface and the imaging-side focusing element 45 are identical to each other. The rays are reflected in the roof prism portion 49 twice, so that an erect image having the same size of an object on the original (the equimagnification) is formed. In this case, effective reading widths of adjacent focusing elements 44 and 45 overlap each other so that a required effective reading width is obtained. Thus, the focal length of each of the focusing elements 44 and 45 can be reduced, so that the imaging device can be miniaturized.

Figure 11D:
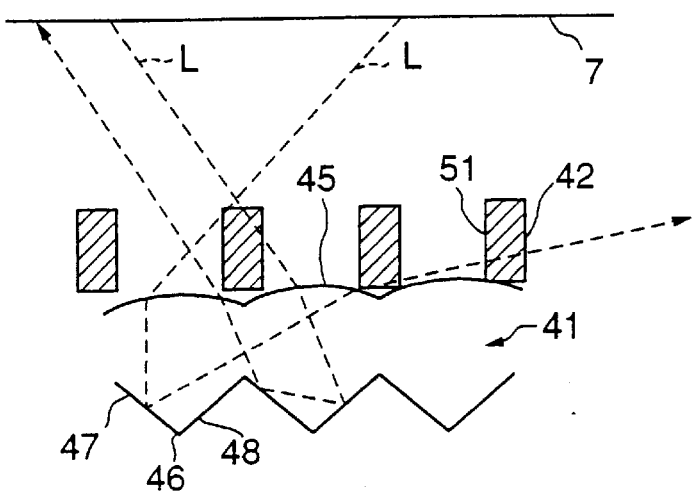

As shown in FIG. 11D, the aperture block 42 prevents the stray light from affecting the rays for images. Although the real device has three dimensions, FIG. 11D illustrates a two dimensional model of the imaging device to simplify.

According to the above embodiment, the degree of freedom of the layout of the imaging position can be improved in comparison with the conventional case (see Japanese Patent Publication No.61-2929). The rays travel used for imaging travel along the optical axis φ1 and φ2, so that the utilization of the amount of the light can be improved. The separation mirrors 109(1) and 109(2) which are used in the conventional type of the imaging device can be omitted. The axis φ1 of the incident-side focusing element 44 is perpendicular to the axis φ2 of the imaging-side focusing element 45. Thus, the stray light can be prevented from being incident on the imaging surface. As a result, the stray light does not affect the imaging characteristics, so that the contrast and the resolution of images formed on the imaging surface can be improved.

Figure 12:
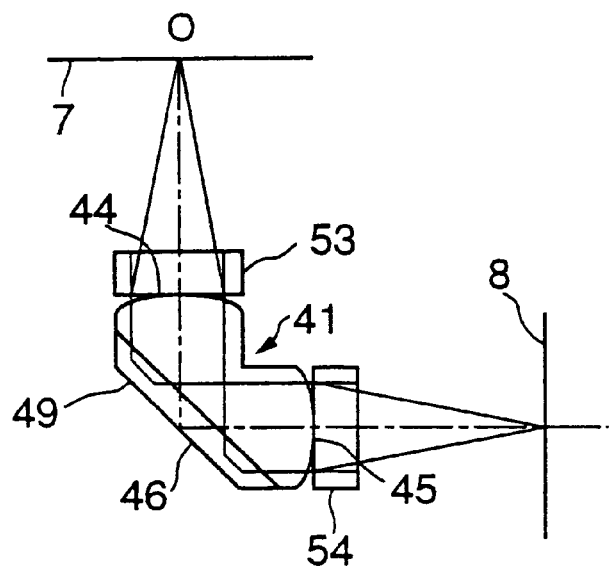
FIG. 12 is a diagram illustrating a structure of the imaging device according to a ninth embodiment of the present invention.

The imaging device according to the ninth embodiment of the present invention is formed as shown in FIG. 12. In FIG. 12, those parts which have the same function as those shown in FIGS. 3A through FIG. 11D are given the same reference numbers. In this embodiment, aperture members 53 and 54 are respectively mounted on the incident-side focusing element 44 and the imagingside focusing element 45 of each of the roof prism lenses 43.

Figure 13:
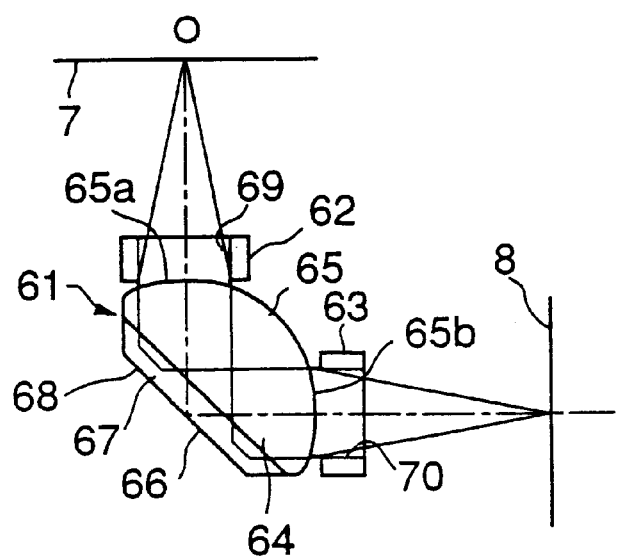
FIG. 13 is a diagram illustrating a structure of the imaging device according to a tenth embodiment of the present invention.

The imaging device according to the tenth embodiment of the present invention is formed as shown in FIG. 13. This type of imaging device is used as the equimagnification imaging device.

Referring to FIG. 13, the imaging device has a roof prism lens array 61 and aperture members 62 and 63 which are assembled. The roof prism lens array 61 is formed roof prism lenses 64 which are arranged in line. Each of the roof prism lenses 64 is a minimum unit of the imaging system. Each of the roof prism lenses 64 has a focusing element portion 65 and a roof prism portion 68 which are integrated with each other. The roof prism portion 68 has surfaces 67 (one of the surface 67 is shown in FIG. 13) which are connected to each other at an angle of 90° so that a ridge line 66 is formed. The focusing element portion 65 has an incident-side focusing portion 65a and an imaging-side focusing portion 65b. The incident-side focusing portion 65a and the imaging-side focusing portion 65b have an optically equivalent focusing function. The optical axis φ1 of the incident-side focusing portion 65a is perpendicular to the optical axis φ2 of the imaging-side focusing portion 65b. The ridge line 66 is on a plane including the optical axes φ1 and φ2, intersects the optical axes φ1 and φ2, and is inclined at an angle of 45° with respect to the optical axes φ1 and φ2. The direction in which the roof prism lenses 64 are arranged is perpendicular to the ridge line 66 of each of the roof prism lenses 64. In the respective aperture members 62 and 63, apertures 69 and 70 are arranged in a line at the same intervals as the roof prism lenses 64.

In the imaging device having the above structure, the optical axis of the incident-side focusing portion 65a is on a plane which includes the ridge line 66 of the roof prism portion 68 and is perpendicular to the direction in which the roof prism lenses 64 are arranged. The incident-side focusing portion 65a makes the rays from the original be in parallel, and the rays are then incident on the roof prism portion 68. The rays are reflected by the surfaces 67 in the roof prism portion 68 twice so that the direction in which the rays travel is changed by an angle of 90°. The rays are then emitted from the imaging-side focusing portion 65b. The rays are focused on the imaging surface by the imaging-side focusing portion 65b so that images are formed on the imaging surface.

Since the imaging-side focusing portion 65b is optically equivalent to the incident-side focusing portion 65a, the relationship between the reading surface and the incident-side focusing portion 65a and the relationship between the imaging surface and the imaging-side focusing portion 65b are identical to each other. The rays are reflected in the roof prism portion 68 twice, so that an erect image having the same size of an object on the original (the equimagnification) is formed. In this case, effective reading widths of adjacent focusing element portions 65 (each of which is formed of the focusing portions 65a and 65b) overlap each other so that a required effective reading width is obtained. Thus, the focal length of each of the focusing portions 65a and 65b can be reduced, so that the imaging device can be miniaturized.

A single focusing element portion 65 includes the incident-side focusing portion 65a and the imaging-side focusing portion 65*b*. The focusing element portion can be easily made in comparison with a case where two focusing elements are separately made.

Figure 14A:
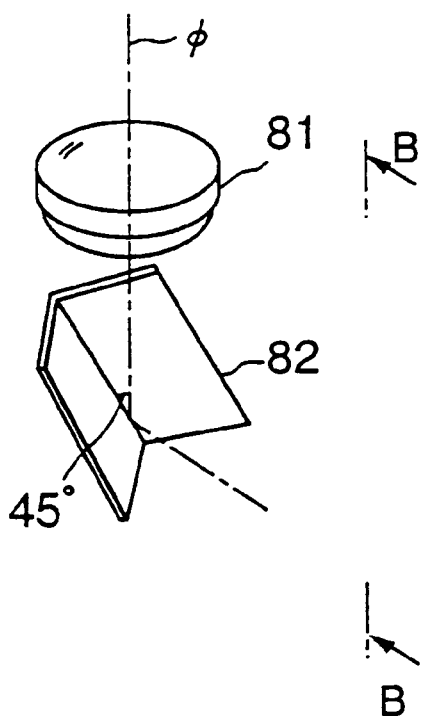
FIGS. 14A, 14B, 14C and 14D are diagrams illustrating an eleventh embodiment of the present invention.
Figure 14B:
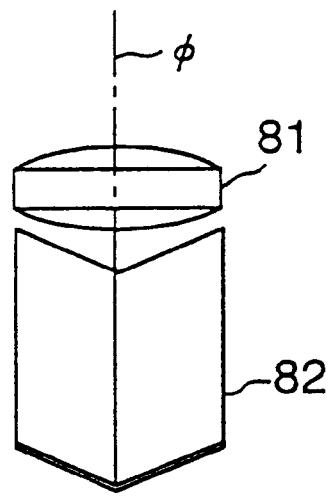
Figure 14C:
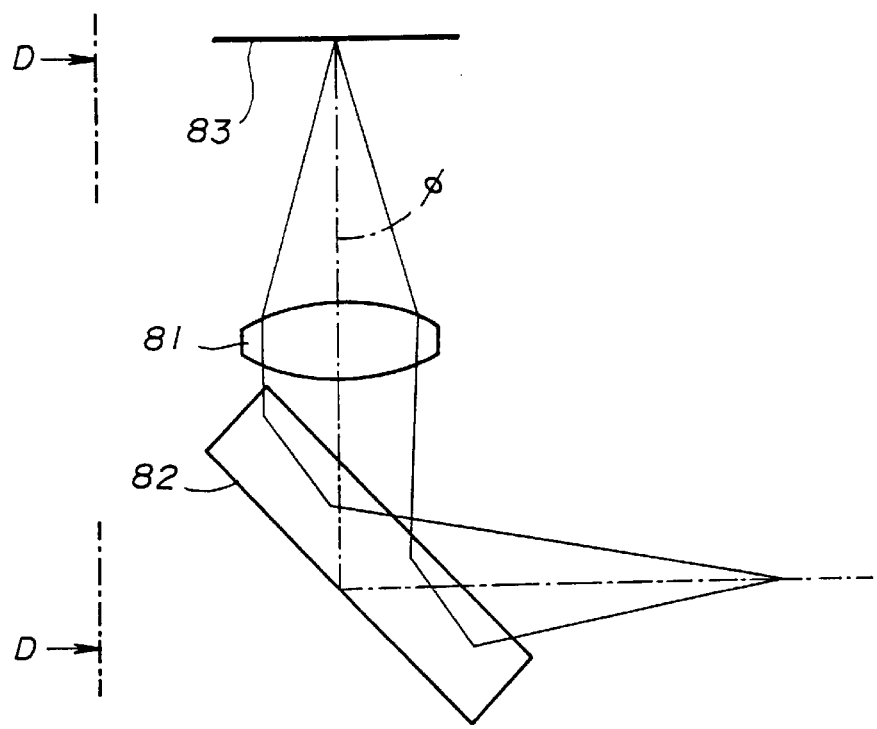
Figure 14D:
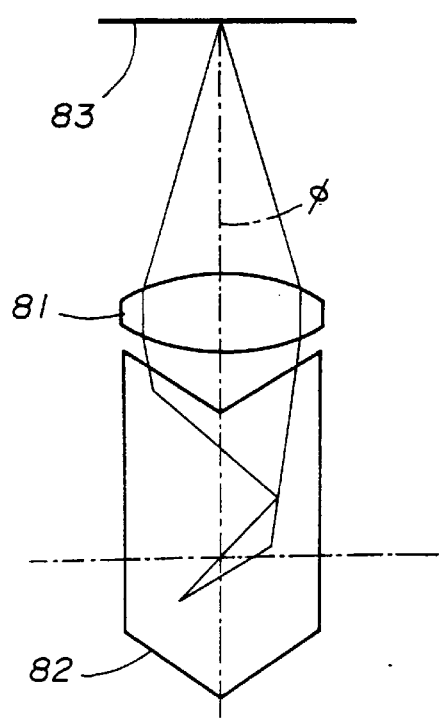

The image device according to the eleventh embodiment of the present invention is formed as shown in FIG. 14A through FIG. 14D. FIG. 14A is a perspective view, FIG. 14B is a view in a direction B shown in FIG. 14*a*, FIG. 14C is a diagram illustrating focused rays, and FIG. 14D is a view in a direction D shown in FIG. 14C.

This type of imaging device has a focusing element 81 and a roof mirror 82. The roof mirror 82 is inclined at an angle of 45° with respect to the optical axis φ of the focusing element 81. The roof mirror 82 has a function for separating optical paths. An erect image is formed on a plane facing in a direction perpendicular to the ridge line of the roof mirror 82. A line sensor is located on the plane.

The roof mirror 82 may be inclined at an angle other than 45°. Based on the layout of the imaging device in optical equipment, the inclining angle of the roof mirror 82 is decided. If the size of the focusing element 81 is not limited, the inclining angle of the roof mirror 82 may be less than 45°.

Solid lines shown in FIGS. 14C and 14D correspond to rays travels in a diagonal direction with respect to the ridge line of the roof mirror 82. The design of the lens may be performed in accordance with the known ray tracing simulation method.

Figure 15:
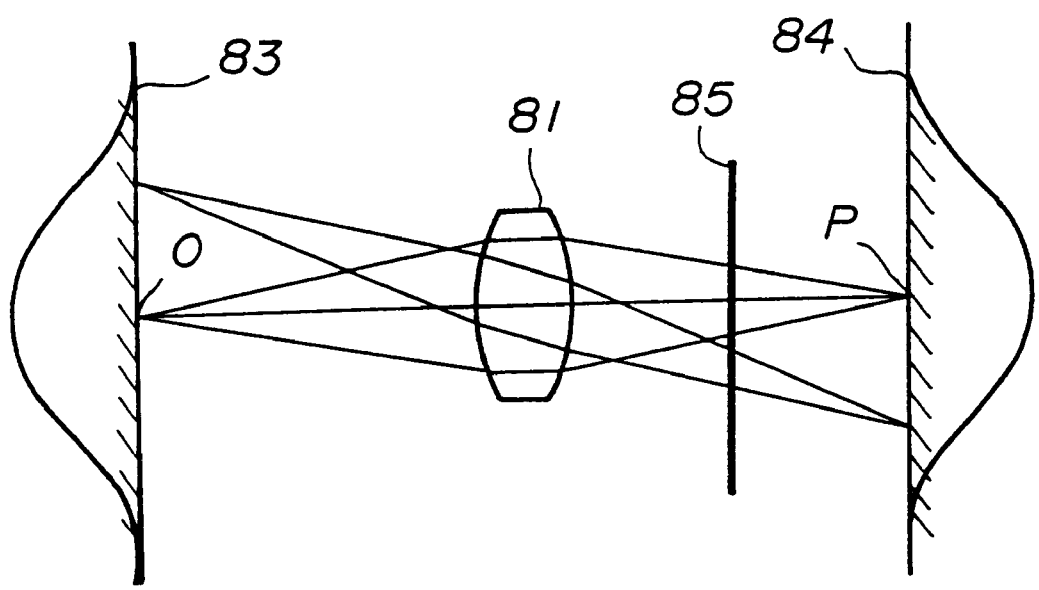
FIG. 15 is a diagram illustrating optical paths in an optical system equivalent to the imaging device shown in FIGS. 14A through 14D.

FIG. 15 illustrates optical paths in an optical system which is optically equivalent to the imaging device shown in FIGS. 14A, 14B, 14C and 14D. In FIG. 15, those parts which are the same as those shown in FIGS. 14A through 14D are given the same reference numbers.

Rays from corresponding to information on an original 83 is reflected twice by the roof mirror located on an imaginary surface 85. The imaginary surface 85 includes the ridge line of the roof mirror. The rays are then condensed on the focusing element 81. The focusing element 81 focuses the rays so that an image is formed at an imaging position P.

In a conventional case, a mirror is placed on the imaginary surface 85, so that the rays are reflected by the mirror in a direction perpendicular to a plane of FIG. 15. An inverted image is formed on an imaging surface facing the plane of FIG. 15.

Figure 16:
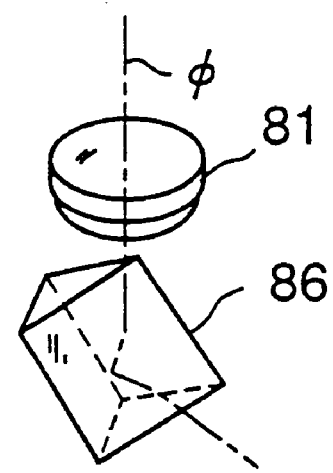
FIG. 16 is a diagram illustrating a structure of the imaging device according to a twelfth embodiment of the present invention.

The imaging device according to the twelfth embodiment of the present invention is formed as shown in FIG. 16. In FIG. 16, those parts which are the same as those shown in FIGS. 14A through 15 are given the same reference numbers.

Referring to FIG. 16, the imaging device has the focusing element 81 and a roof prism 86. The rays condensed by the focusing element 81 are incident on the roof prism 86. The rays are then reflected twice by surfaces perpendicular to each other in the roof prism 86. The rays emitted from the rectangular prism 86 are focused so that an image is formed on an imaging position.

In a case where the roof prism 86 is made of general glass, the refractive index n for the visible region is about 1.54 (n=1.54). If the rays are incident on the roof prism 86 under a critical condition (an incident angle θ=1/n; 40.5° in this case), the rays are in a total reflection state in the roof prism 86.

Figure 17:
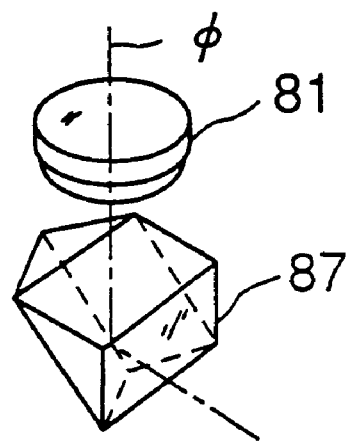
FIG. 17 is a diagram illustrating a structure of the imaging device according to a thirteenth embodiment of the present invention.

The imaging device according to the thirteenth embodiment of the present invention is formed as shown in FIG. 17. In FIG. 17, those parts which are the same as those shown in FIGS. 14A through 16 are given the same reference numbers.

Referring to FIG. 17, the imaging device has the focusing element 81 and a roof prism 87. The roof prism 87 has a surface on which the rays condensed by the focusing element 81 are incident. The normal line of the surface is parallel to the optical axis φ of the focusing element 81. The roof prism 87 has a surface through which the rays incident on the roof prism 87 is emitted.

Figure 18:
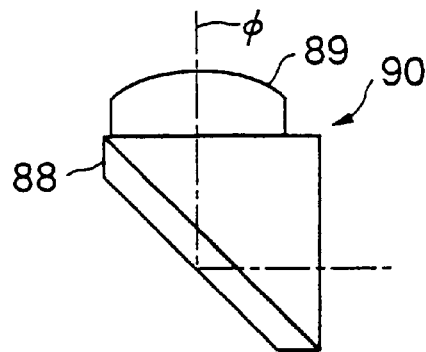
FIG. 18 is a diagram illustrating a structure of the imaging device according to a fourteenth embodiment of the present invention.

The imaging device according to the fourteenth embodiment of the present invention is formed as shown in FIG. 18.

Referring to FIG. 18, an imaging device 90 has a roof prism 88 and a focusing element 89. The roof prism 88 and the focusing element 89 are integrated with each other. In this type of imaging device, there is no boundary surface between a lens surface and air. Thus, a reflection loss of the rays traveling in the imaging device can be reduced.

Figure 19:
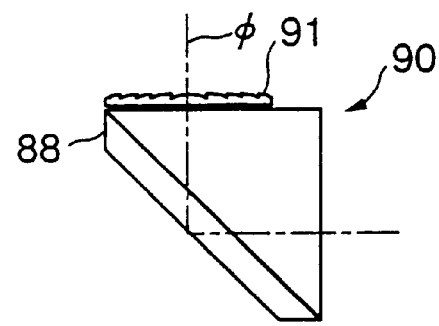
FIG. 19 is a diagram illustrating a structure of the imaging device according to a fifteenth embodiment of the present invention.

The imaging device according to the fifteenth embodiment of the present invention is formed as shown in FIG. 19. In FIG. 19, those parts which are the same as those shown in FIG. 18 are given the same reference numbers.

Referring to FIG. 19, the imaging device 90 has the roof prism 88 and a Fresnel lens 91. The roof prism 88 and the Fresnel lens 91 are integrated with each other using a lens cell. The Fresnel lens 91 may be adhered to the prism by a conventional method. The Fresnel lens 91 or a hologram lens which is plane shaped may be set on the roof prism. The Fresnel lens 91 may be directly formed on the prism by a 2P molding process using 2P resin or an injection molding process.

Figure 20:
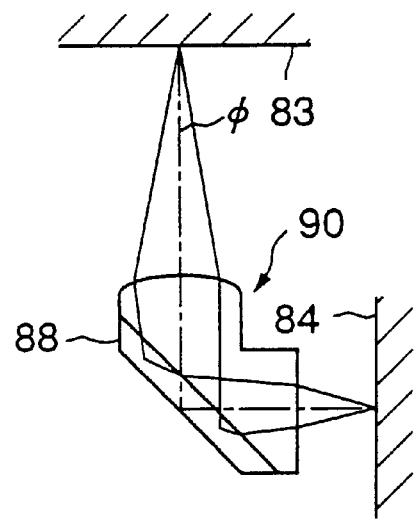
FIG. 20 is a diagram illustrating a structure of the imaging device according to a sixteenth embodiment of the present invention.

The imaging device according to the sixteenth embodiment of the present invention is formed as shown in FIG. 20. In FIG. 20, those parts which are the same as those shown in FIGS. 14 through 18 are given the same reference numbers.

In this type of the imaging device, the roof prism 88 and a focusing element which differs from those show in FIGS. 18 and 19 are integrated with each other.

Figure 21A:
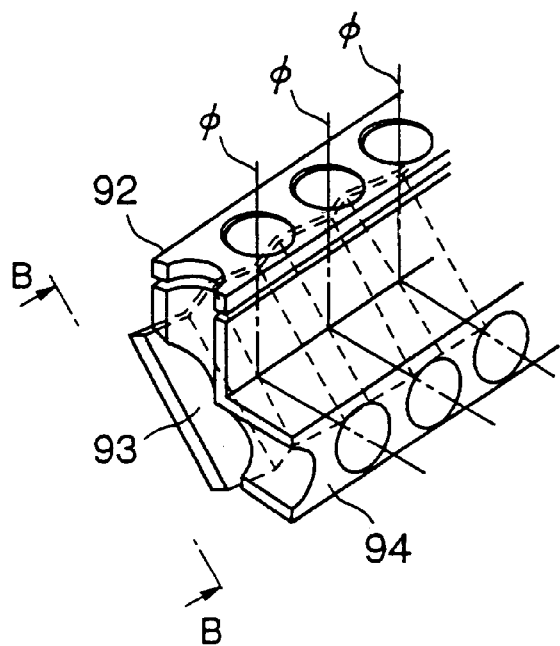
FIGS. 21A and 21B are diagrams illustrating a structure of the imaging device according to a seventeenth embodiment of the present invention.
Figure 21B:
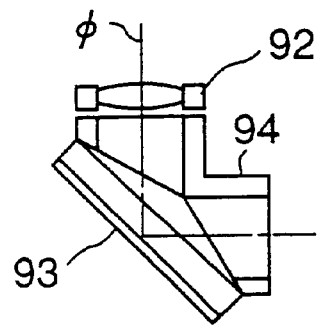

The imaging device according to the seventeenth embodiment of the present invention is formed as shown in FIGS. 21A and 21B. FIG. 21A is a perspective view and FIG. 21B is a view in a direction B shown in FIG. 21A.

Referring to FIGS. 21A and 21B, the imaging device has a lens array 92, a roof mirror array 93 and an aperture member 94. The lens array 92 has lenses arranged in line at constant intervals. The roof mirror array 93 has roof mirrors arranged in line at the same intervals as the lenses of the lens array 92. The aperture member 94 is put between the lens array 92 and the roof mirror array 93. The aperture member 94 has apertures having an area corresponding to the lenses of the lens array 92. The apertures are arranged in line at the same intervals as the lenses of the lens array 92.

The optical axis of a single lens is on a plane including a ridge line of a corresponding roof mirror and being perpendicular to a direction in which the lenses are arranged. Rays from an object are condense by the lens and reflected twice by the corresponding roof mirror. The direction in which the rays travel is changed by an angle which is twice as large as the inclining angle of the ridge line of the roof mirror. The rays are then focused on the imaging surface. The single lens makes an image having the same size as the object. Since the rays are reflected twice by the roof mirror, an erect image is formed.

Due to the aperture member 94 set between the lens array 92 (a focusing element array) and the roof mirror array 93, the resolution and the amount of light incident on the lenses are optimized. The aperture member 94 prevents the cross talk from occurring between adjacent lenses.

In a case of the imaging device as describe above, effective reading widths of adjacent lenses overlap each other so that a required effective reading with is obtained. If a single lens which has the effective reading width corresponding to the width of an A4 sized sheet is designed, the size of the single lens is large so that the focal length is large. However, in the imaging device as described above, the focal length of each of the lenses can be small, so that the miniaturized imaging device can be obtained.

Figure 22A:
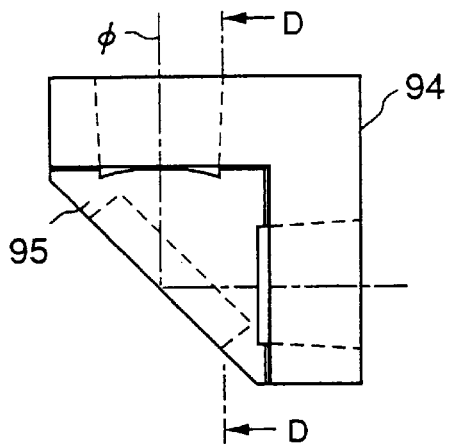
FIGS. 22A, 22B, 22C and 22D are diagrams illustrating a structure of the imaging device according to a eighteenth embodiment of the present invention.
Figure 22B:
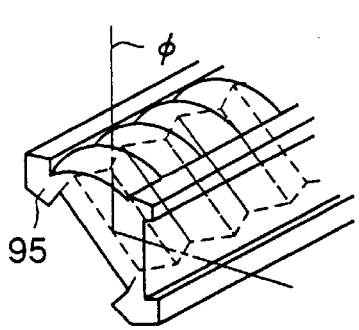
Figure 22C:
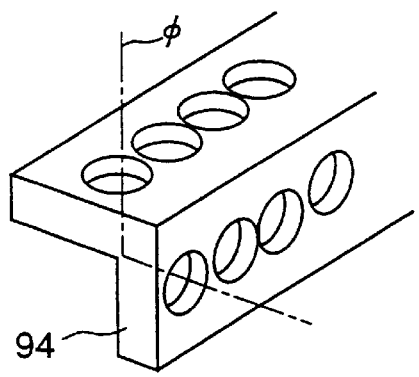
Figure 22D:
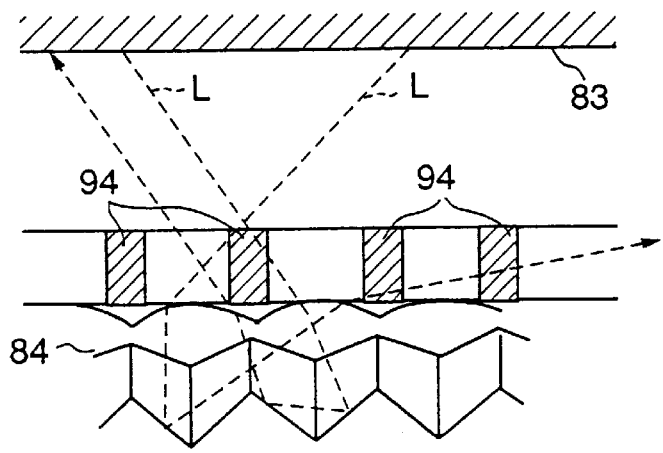

The imaging device according to the eighteenth embodiment of the present invention is formed as shown in FIGS. 22A through 22D. FIG. 22A is a side view, FIGS. 22B and 22C are perspective view of respective parts of the imaging device, and FIG. 22D is a view in a direction D shown in FIG. 22A.

This type of imaging device has a roof prism lens array 95 and the aperture member 94. The roof prism lens array 95 is formed of a focusing element array and a roof prism array which are integrated with each other. The aperture member 94 is located in front of the roof prism lens array 95. The aperture member 94 has apertures having an area corresponding to focusing elements of the focusing element array.

The optical axis of a single focusing element is on a plane including a ridge line of a corresponding roof prism and being perpendicular to a direction in which the focusing elements are arranged. Rays from an object are condense by the focusing element and reflected twice in the corresponding roof prism. The direction in which the rays travel is changed by an angle which is twice as large as the inclining angle of the ridge line of the roof prism. The rays are then focused on the imaging surface. The focusing element makes an image having the same size as the object. Since the rays are reflected twice by the roof mirror, an erect image is formed.

Due to the aperture member 94 set in front of the roof prism lens array 95, the resolution and the amount of light incident on the lenses are optimized. The aperture member 94 prevents the cross talk from occurring between adjacent focusing elements. As show in FIG. 22D, the aperture 94 prevents rays reflected by adjacent roof prisms from affecting images to be formed.

In a case of the imaging device as describe above, effective reading widths of adjacent roof prism lenses overlap each other so that a required effective reading with is obtained. If a single prism lens which has the effective reading width corresponding to the width (e.g, 220 mm) of an A4 sized sheet is designed, the size of the single lens is large so that the focal length is large. However, in the imaging device as described above, the focal length of each of the prism lenses arranged in line can be small, so that the miniaturized imaging device can be obtained.

Figure 23:
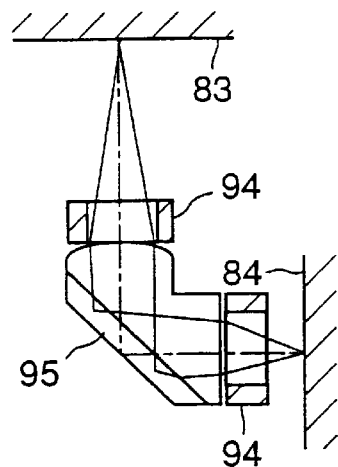
FIG. 23 is a diagram illustrating a structure of the imaging device according to a nineteenth embodiment of the present invention.

The imaging device according to the nineteenth embodiment of the present invention is formed as shown in FIG. 23. In FIG. 23, those parts which are the same as those shown in FIGS. 14A through 22D are given the same reference numbers.

In this type of the imaging device, the aperture member 94 is divided into two parts. One of the parts is set in front of a surface of the prism lens on which the rays from the object are incident. Another of parts is set in front of a surface of the prism lens from which the rays reflected in the prism lens are emitted.

A description will now be given of other embodiments of the present invention.

Figure 24:
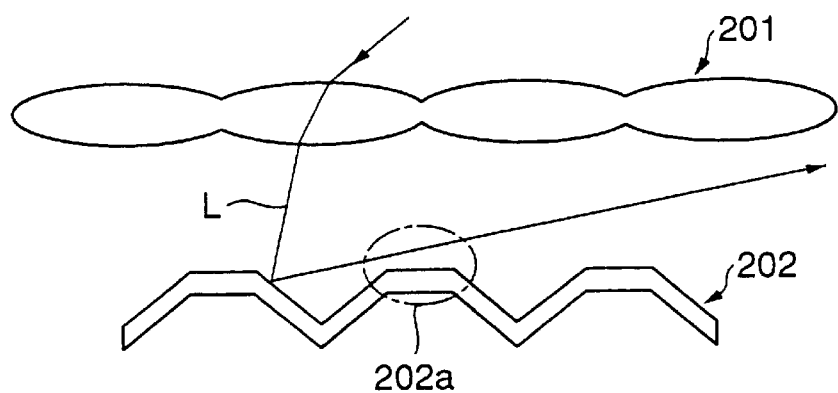
FIG. 24 is a diagram illustrating a structure of the imaging device according to a twentieth embodiment of the present invention.

Referring to FIG. 24, the imaging device has a lens array 201 and a roof mirror array 202. A regular reflection preventive structure is formed on some or all of ridge line portions 202a, between arranged optical axes, of the roof mirror array 202. The regular reflection preventive structure controls directions of stray light and a degree of scattering in the imaging device. A flat surface, a curved surface and a polygonal surface may be formed as the regular reflection preventive structure on the ridge line portions 202a, between arranged optical axes, of the roof mirror array 202.

Figure 25:
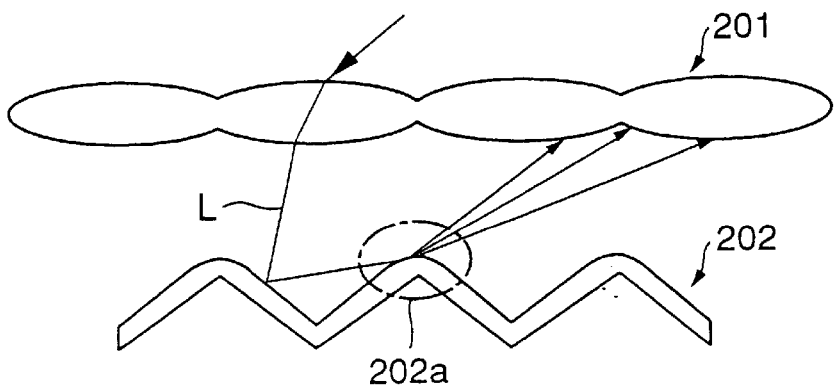
FIG. 25 is a diagram illustrating a structure of the imaging device according to a twenty-first embodiment of the present invention.

In the imaging device according to the twentieth embodiment as shown FIG. 24, a flat surface is formed as the regular reflection preventive structure on each of the ridge line portions 202a, between arranged optical axes, of the roof mirror array 202. In the imaging device according to the twenty-first embodiment of the present invention as shown in FIG. 25, a curved surface is formed as the regular reflection preventive structure on each of the ridge line portions 202a of the roof mirror array 202.

As shown in FIG. 24, the amount of stray light reflected at the ridge line portions 202a of the roof mirror array 202 can be decreased. In the case shown in FIG. 25, the degree of scattering of the stray light L can be controlled in accordance with the curving condition of the curved surface. In addition, in a case where a polygonal surface is formed as the regular reflection preventive structure on each of the ridge line portions 202a, between arranged optical axes, of the roof mirror array 202, the stray light can be divided into parts, and directions of the parts of the stray light and the amount of the parts of the stray light can be controlled.

The regular reflection preventive structure can decrease the amount of stray light, so that it is not necessary to close the lens array 201 and the roof mirror array 202 to each other. Thus, the degree of freedom of the optical design of the imaging device can be improved. Further, since only the stray light is controlled, the brightness of images is not affected by the regular reflection preventive structure. Thus, high quality images can be formed by the imaging device.

Figure 26:
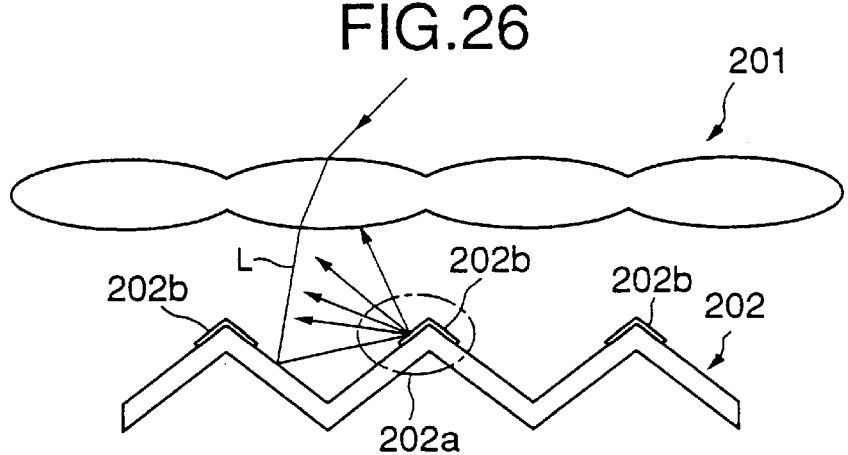
FIG. 26 is a diagram illustrating a structure of the imaging device according to a twenty-second embodiment of the present invention.

The imaging device according to the twenty-second embodiment is formed as shown in FIG. 26. In FIG. 26, those parts which are the same as those shown in FIGS. 24 and 25 are given the same reference numbers.

Referring to FIG. 26, a rough surface member 202b is mounted on each of the ridge line portion 202a, between arranged optical axes, of the roof mirror array 202. The stray light L incident on the each of the ridge line portion 202a is scattered by the rough surface member 202b. The amount of the stray light L is reduced, so that high quality images can be obtained.

Figure 27:
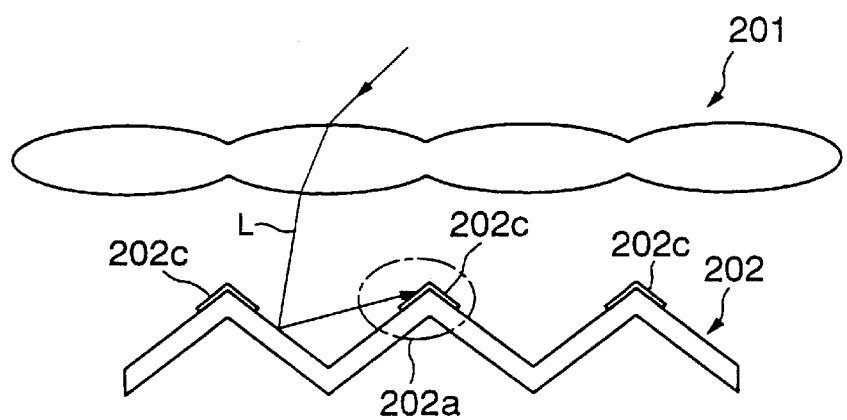
FIG. 27 is a diagram illustrating a structure of the imaging device according to a twenty-third embodiment of the present invention.

The imaging device according to the twenty-third embodiment of the present invention is formed as shown in FIG. 27. In FIG. 27, those parts which are the same as those shown in FIGS. 24, 25 and 26 are given as the same reference numbers.

Referring to FIG. 27, a light absorbing member 202c is mounted on each of the ridge line portion 202a, between arranged optical axes, of the roof mirror array 202. the stray light L incident on the each of the ridge line portion 202a is absorbed by the light absorbing member 202c. The stray light reflected by each of the ridge line portions 202a can be eliminated, so that high quality images (high contrast images) can be obtained.

Figure 28:
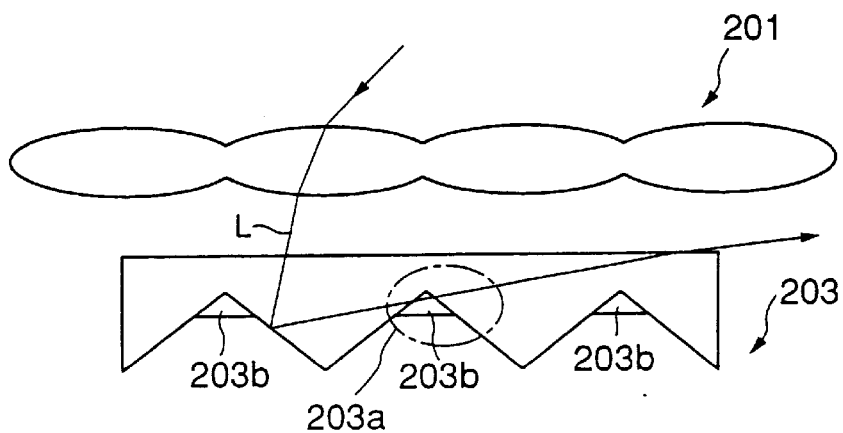
FIG. 28 is a diagram illustrating a structure of the imaging device according to a twenty-fourth embodiment of the present invention.

The imaging device according to the twenty-fourth embodiment of the present invention is formed as shown in FIG. 28. In FIG. 28, those parts which are the same as those shown in FIGS. 24, 25, 26 and 27 are given of the same reference numbers.

Referring to FIG. 28, the imaging device has the lens array 201 and a roof prism array 203. The roof prism array 203 has root portions 203a between arranged optical axes. At each of the root portions 203a, surfaces are connected to each other so that a V-shaped groove is formed. A transparent member 203b is provided in each of the root portions 203a of the roof prism array 203. The transparent has a refractive index close to that of the roof prism array 203. The light passes through the transparent member 203b, so that the amount of stray light reflected by surfaces of the root portions 203a is reduced.

Figure 29A:
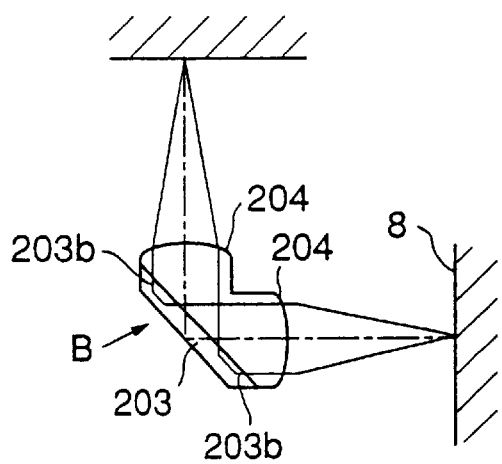
FIGS. 29A, 29B. 29C, 29D, 29E and 29F are diagrams illustrating structures of the imaging device according to other embodiments.

The imaging devices according to other embodiments are formed as shown in FIGS. 29A, 29B, 29C, 29D, 29E and 29F. In FIGS. 29A though 29F, those parts which are the same as those shown in FIGS. 24, 25, 26, 27 and 28 are given of the same reference numbers.

Referring to each of FIGS. 29A, 29B, 29C, 29D, 29E and 29F, the imaging device has the roof mirror prism array 203 and a focusing optical system which are integrated with each other.

In an embodiment shown in FIG. 29A, focusing elements 204 and 204 is connected, as the focusing optical system, to the roof prism 203. The transparent member 203b is applied to both ends of each of the root portions, between arranged optical axes, of the roof prism 203. The refractive index of the transparent member 203b is close to that of the roof prism array 203. The focusing element 204 on which rays from an object are incident makes the rays to be in parallel, and the rays are reflected by the roof prism 203. The rays are then focused by the focusing element 204 which faces the imaging surface so that an image corresponding to the object is formed on the imaging surface.

The amount of light reflected by the root portions of the roof mirror prism 203 can be reduced. As a result, the amount of stray light in the imaging device can be reduced.

Figure 29B:
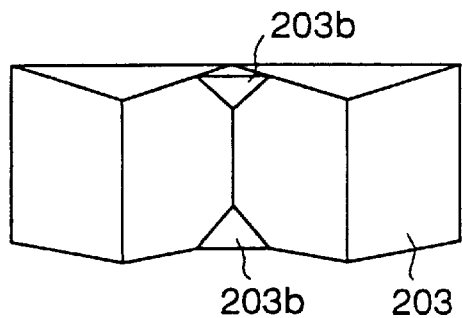
Figure 29C:
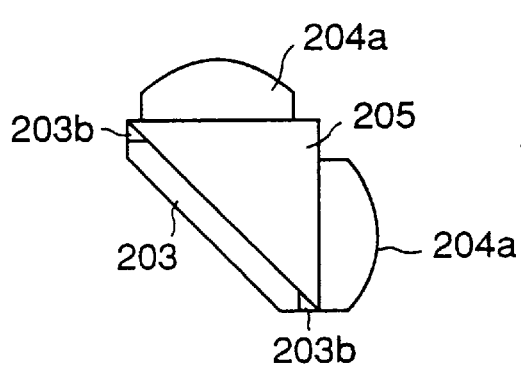
Figure 29D:
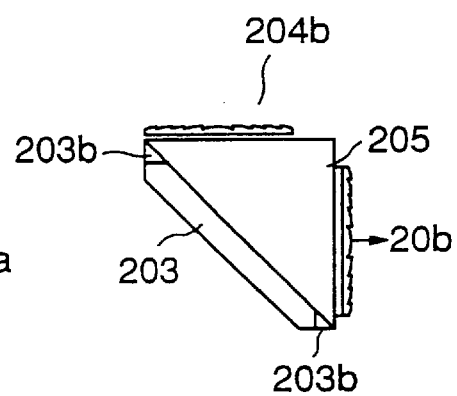
Figure 29E:
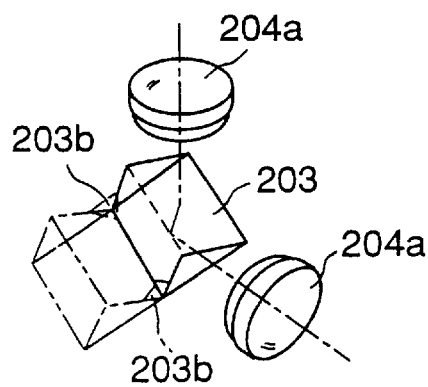
Figure 29F:
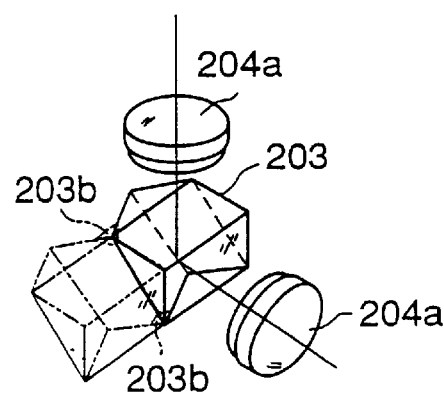
Figure 32:
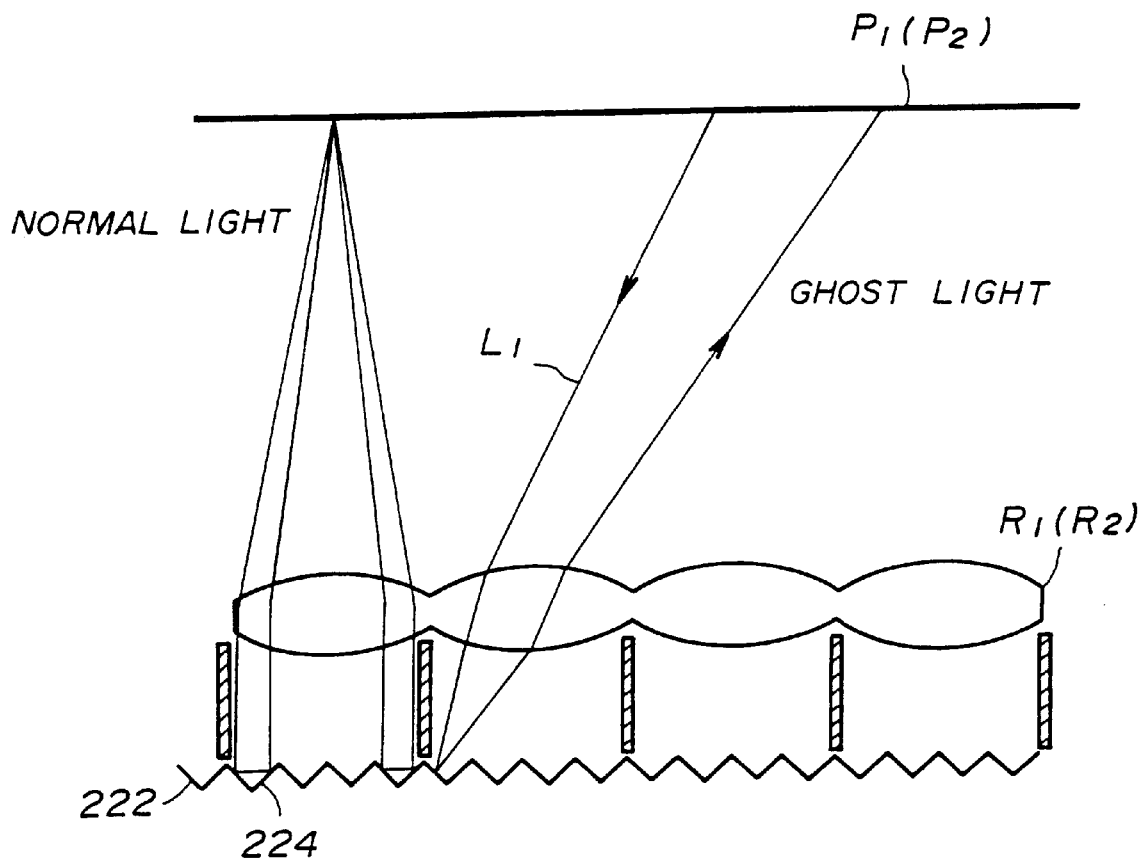
Figure 33B:
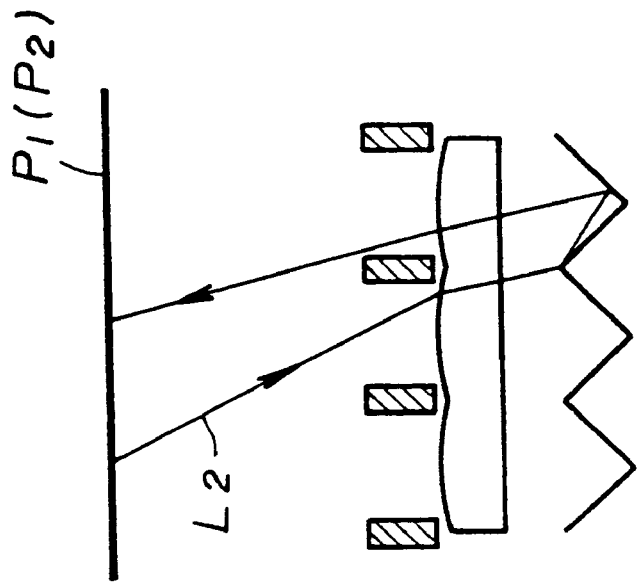
Figure 33A:
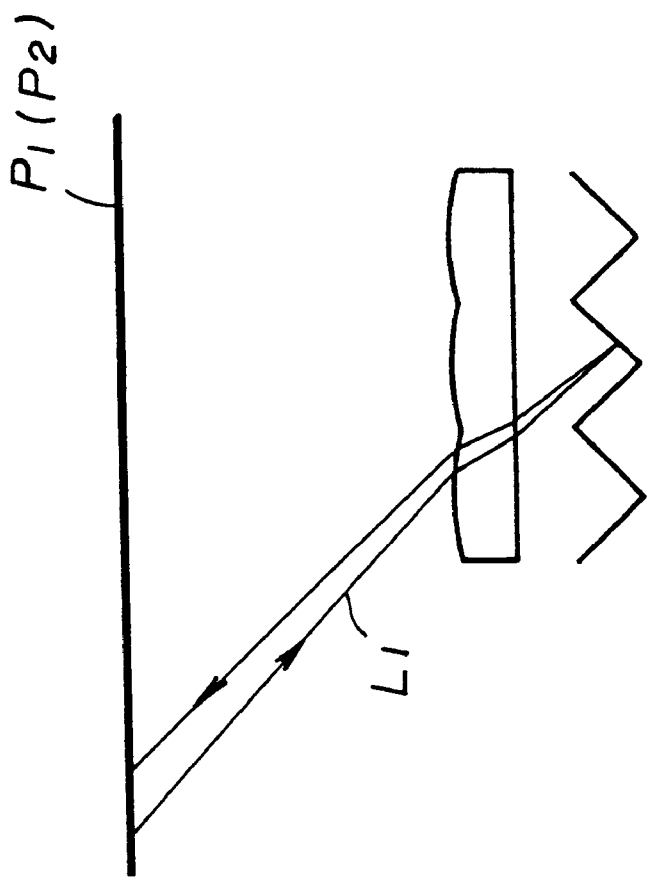
Figure 34:
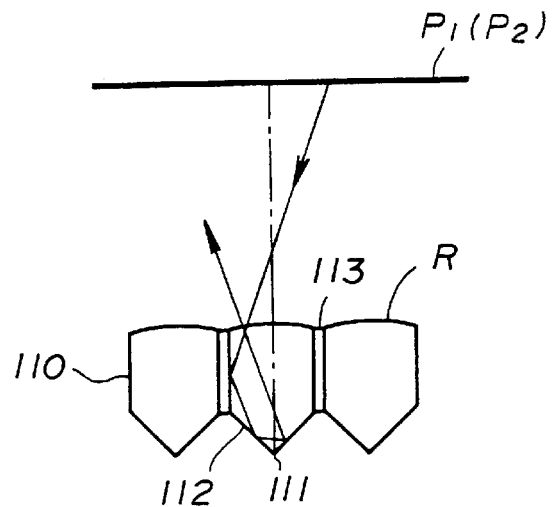
Figure 35A:
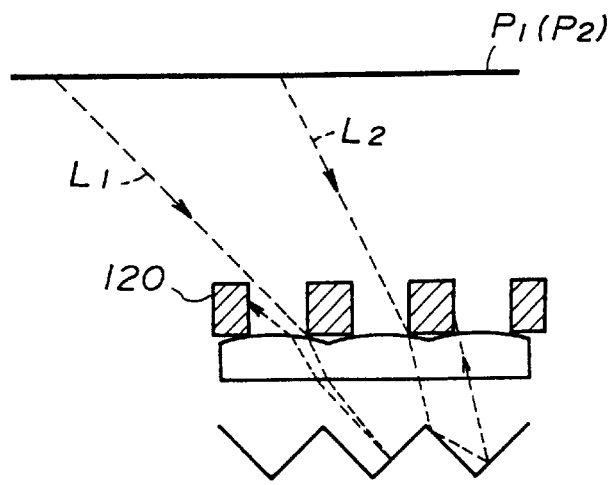
Figure 35B:
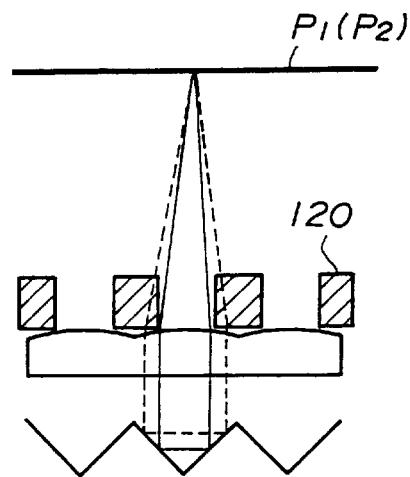
Figure 36:
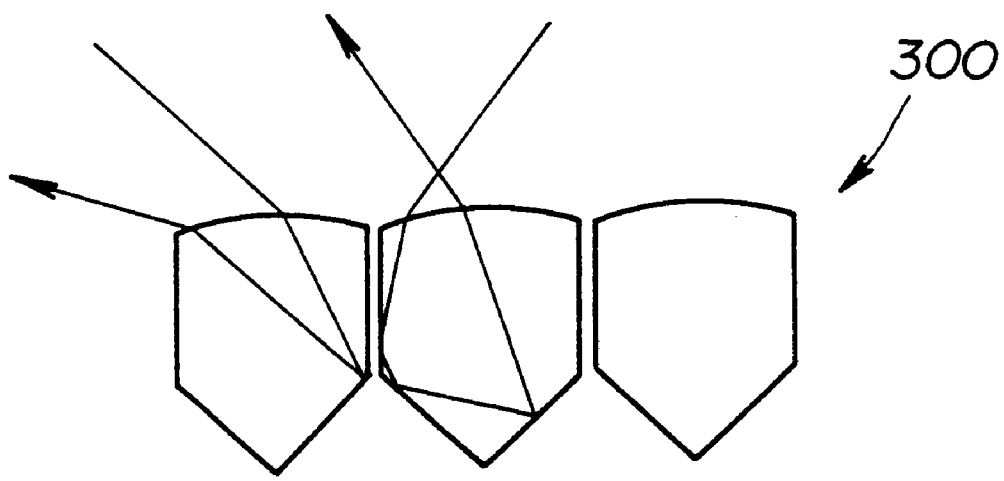

In an embodiment shown in FIG. 29B, the focusing optical system which is connected to the roof lens array 203 is formed of a prism array 205 and focusing elements 204a. In an embodiment shown in FIG. 29C, the focusing optical system which is connected to the roof lens array 203 is formed of a prism array 205 and Fresnel lenses 204b. In embodiments shown in FIGS. 29D and 29E, the focusing optical system which is optically coupled to the roof lens array 203 is formed of lenses 204a.

A description will now be given, with reference to FIG. 37, of another embodiment of the present invention.

Figure 37:
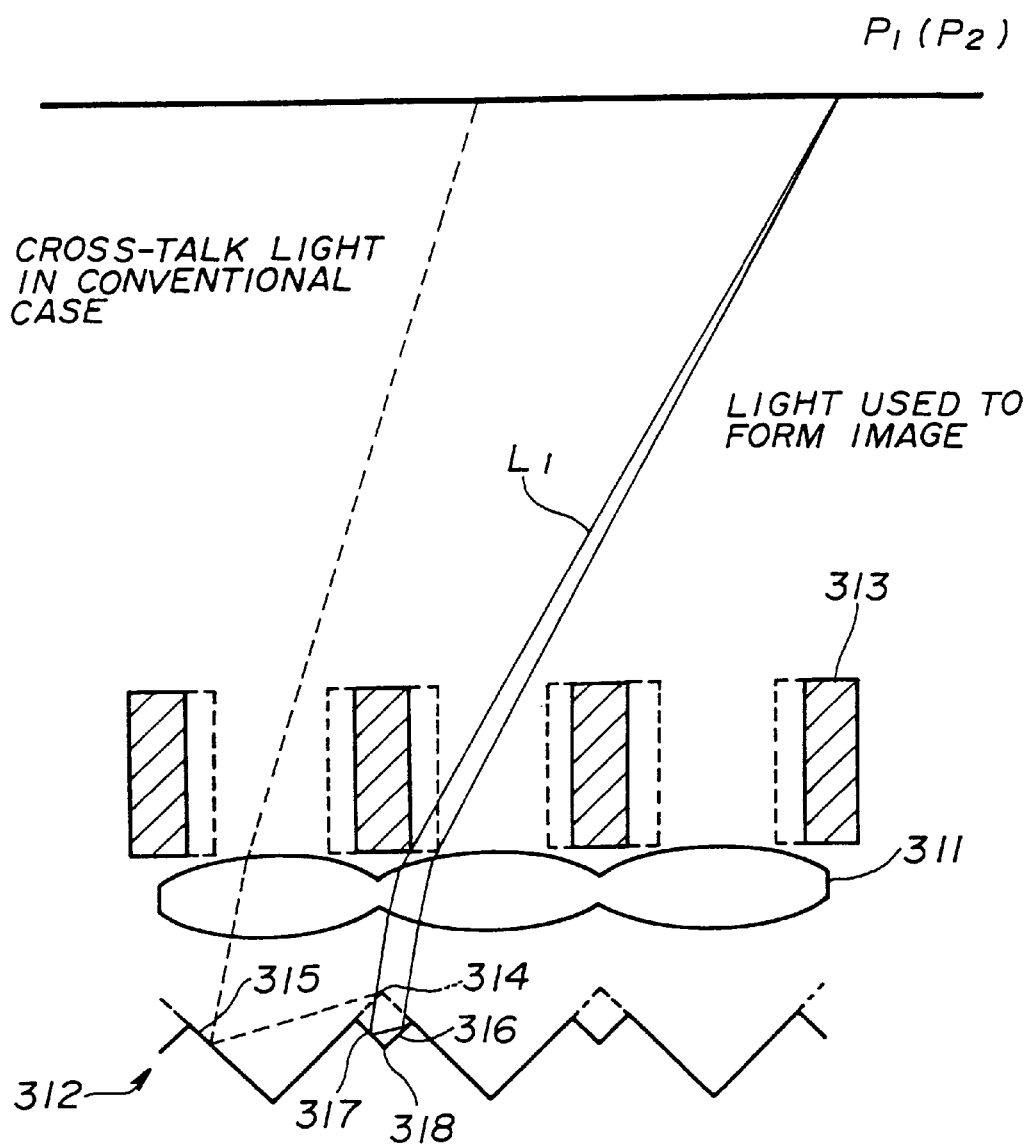
FIG. 37 is a diagram illustrating an example of the structure of the imaging device having a roof mirror.

Referring to FIG. 37, an imaging device has a lens array 311, a roof mirror array 312 and an aperture member 313.

The imaging device has a structure in which two mirrors of the roof mirror array 312 are provided with respect to each of the lenses of the lens array 311. The center of an interval between optical axes of adjacent lenses of the lens array 311 corresponds to a ridge line of the roof mirror array 312. In the roof mirror array 312, mirror surfaces 316 and 317 opposite to a boundary portion between adjacent apertures of the aperture member 313 are smaller than other mirror surfaces 315.

In the conventional case, as shown in FIG. 37, when the light L1 travels past by the lower edge of the aperture of the aperture member 313 and is incident on the roof mirror array 312, cross-talk light indicated by a dashed line is generated. That is, the light L1 is reflected by a valley line portion 314 as shown by a dashed line and the reflection surface 315, so that the light is emitted from a lens adjacent to a lens through which the light should pass.

On the other hand, in the present embodiment, the light L1 incident on the image side lens is reflected by the reflection surface 317 of the roof mirror 312 and then reflected by the other reflection surface 318. As a result, the light can be effectively used to make an image.

In the imaging device according to the present embodiment, even if the light is incident on the lens at an angle so that ghost light or cross-talk light is generated in the conventional case, the path of the light is changed so that an image is formed on an imaging surface. Thus, even if each aperture of the aperture member 313 is wider than that of the conventional aperture member as shown by the dashed line in FIG. 37, the stray light is not generated. The amount of light efficiently used to form an image can be increased.

Figure 38:
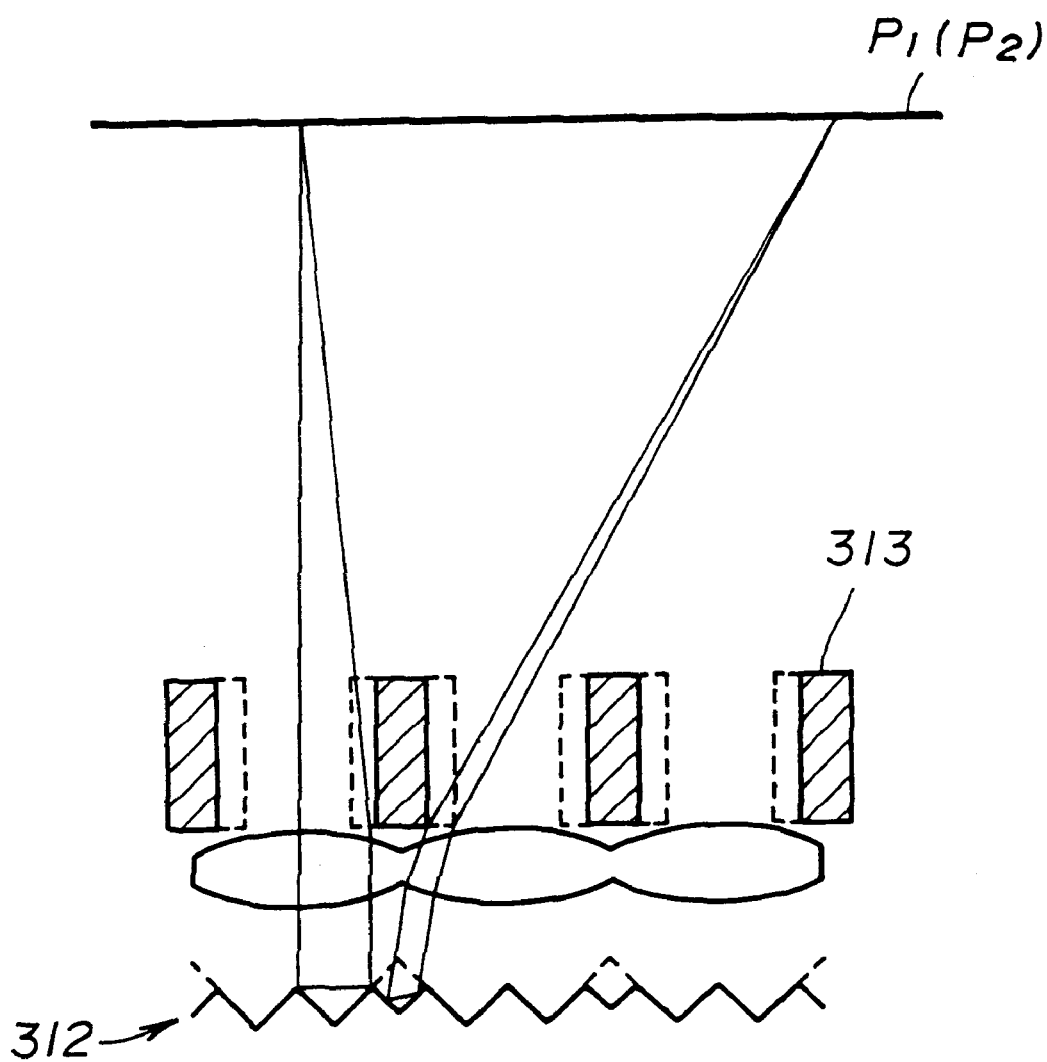
FIG. 38 is a diagram illustrating another example of the structure of the imaging device having a roof mirror.

FIG. 38 shows another embodiment of the present invention.

In this embodiment, three mirrors of the roof mirror array 312 are provided with respect to each of the lenses of the lens array. The center of an interval between the optical axes of the adjacent lenses of the lens array corresponds to a ridge line of the roof mirror array 312. In the roof mirror array 312, mirror surfaces opposite to a boundary portion between adjacent apertures of the aperture member 313 are smaller than other mirror surfaces.

Figure 39:
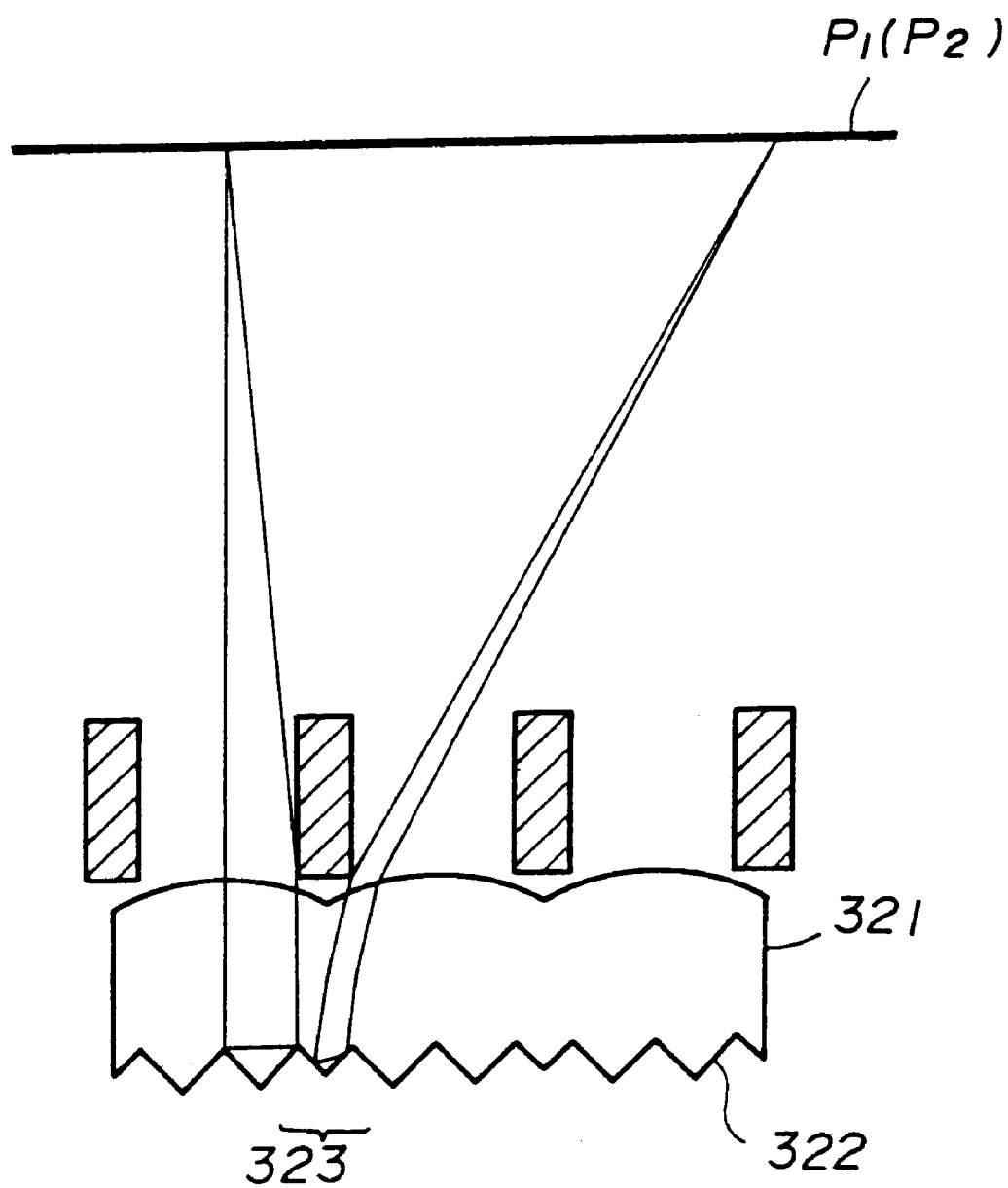
FIG. 39 is a diagram illustrating another example of the structure of the imaging device having a roof prism.

FIG. 39 shows an imaging device according to another embodiment of the present invention.

In this embodiment, the imaging device has a structure in which two prisms of a roof prism array 322 are provided with respect to each of lenses of the lens array 321. The center of an interval between adjacent lenses of the lens array 321 corresponds to a ridge line of the roof prism array 322. In the roof prism array 322, reflection surfaces, of a roof prism 323, opposite to a boundary portion between adjacent aperture of the aperture member are smaller than other reflection surfaces.

In the imaging device shown in FIG. 39, the roof lens prism array (321, 322) has the same function as the roof mirror lens array shown in FIG. 38. Thus, each aperture of the aperture member can be widened =maintaining a state where the stray light is prevented.

A lens arrays crossing layout type imaging device having a roof mirror array may be formed so as to have substantially the same function as the imaging device shown in FIG. 38. The lens arrays crossing layout type imaging device has an original side lens array which should face an original and an image side lens array which should face the imaging surface. An optical axis of each of the original side lens array is perpendicular to an optical axis of a corresponding one of the image side lens array.

In the case of lens arrays crossing layout type imaging device using the roof mirror array, two or three mirrors of the roof mirror array are provided with respect to each of the original side lens array (the image side lens array) in the same manner as in the case shown in FIG. 38. The center of an interval between adjacent lenses corresponds to a ridge line of the roof mirror array. In the roof mirror array, mirrors opposite to a boundary between adjacent apertures of the aperture member are smaller than other mirrors. According to the above structure, the incident light on the image side lens array can be efficiently used to form an image without traveling as the stray light in the same manner as in the case shown in FIG. 38.

A roof prism array may be substituted for the roof mirror array included in the lens arrays crossing layout type image device. This type of the image device has the same function as the image device shown in FIG. 39. That is, two or three prisms are provided with respect to each of the lenses of the original side lens array (the image side lens array). In the same manner as in the case shown in FIG. 39, the center of an interval between adjacent lenses corresponds to a ridge line of the roof prism array. Further, in the roof prism array, reflection surfaces opposite to a boundary between apertures of the aperture member are smaller than other reflection surfaces. According to the above structure of the lens arrays crossing layout type imaging device, the incident light on the image side lens array does not travel as the stray light such as cross-talk light and can be efficiently used to form an image.

In the imaging device, a roof mirror array formed of mirrors having the same size may be used. In addition, a roof prism array formed of reflection surfaces having the same size may be used. An example of the imaging device in which a roof prism array formed of reflection surfaces having the same size is used is shown in FIG. 40.

Figure 40:
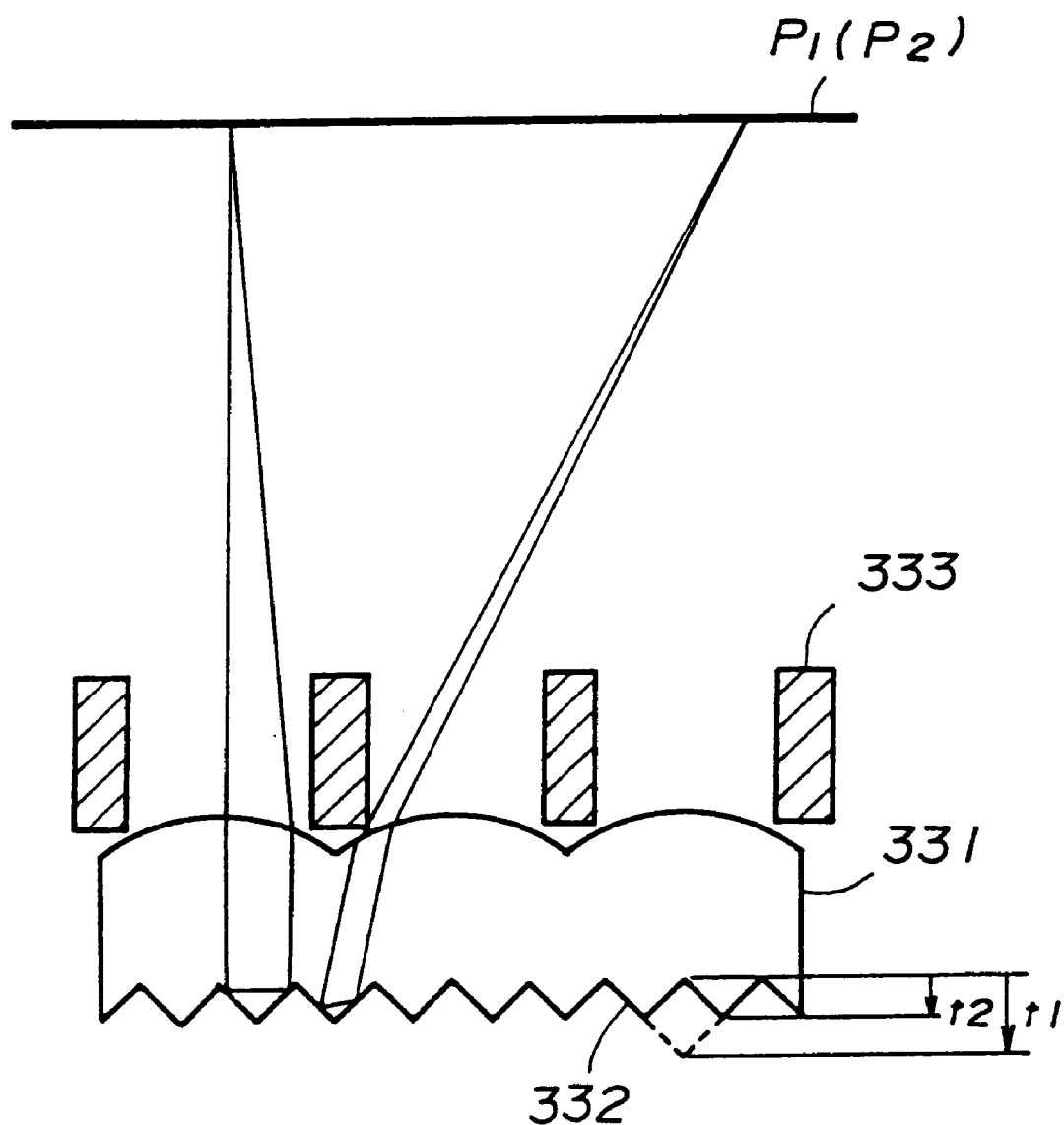
FIG. 40 is a diagram illustrating another example of the structure of the imaging device having a roof prism.

Referring to FIG. 40, the imaging device has a lens array 331, a roof prism array 332 and an aperture unit 333. The roof prism array 332 is provided with reflection surfaces having the same size. The height of the roof prism array 332 can be reduced from t1 to t2. In addition, the roof shaped reflection surfaces can be easily formed, so that the production cost of the roof prism array can be reduced.

Figure 41:
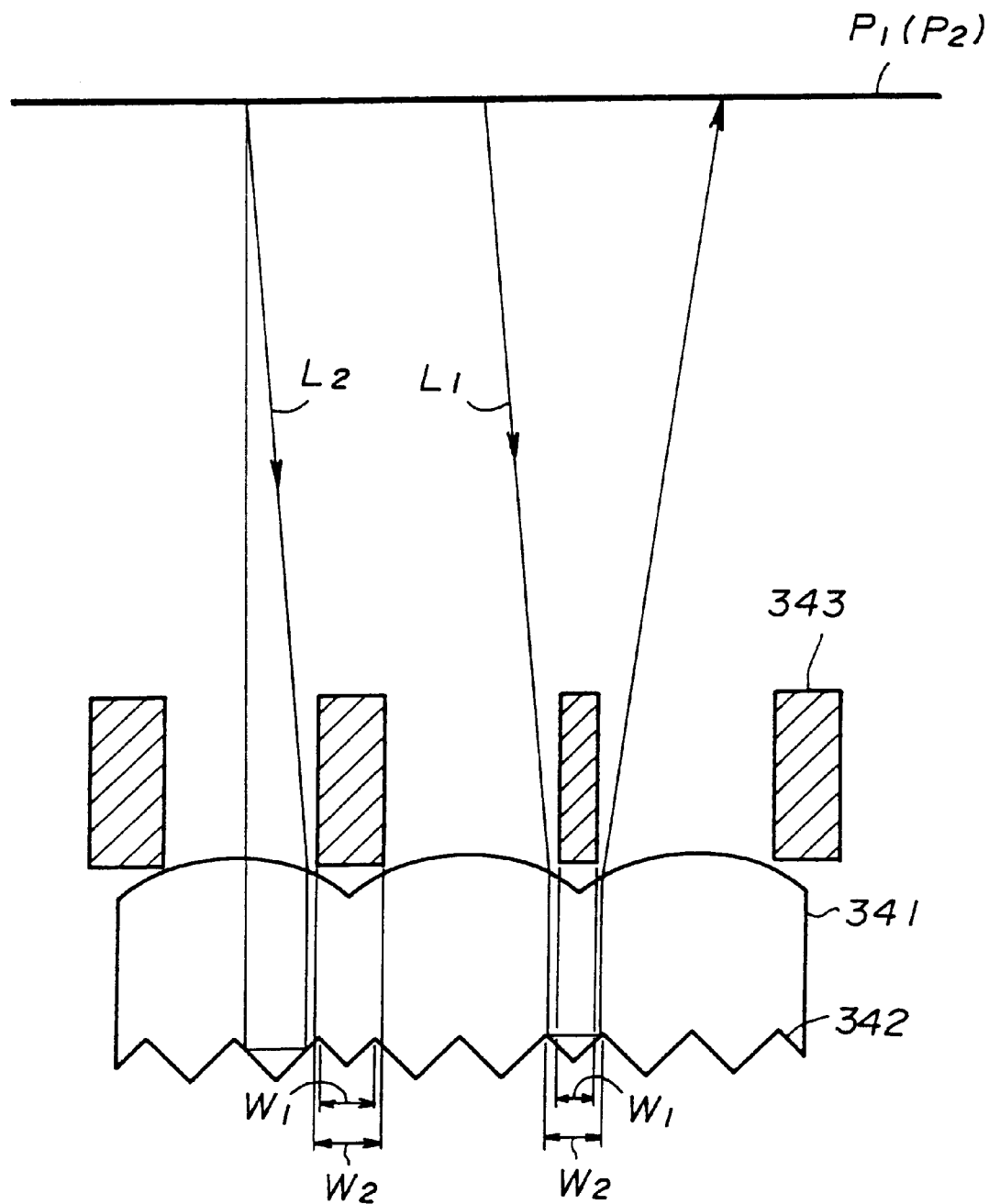
FIG. 41 is a diagram illustrating a relationship between the width of the roof prism and the width of the aperture member in the imaging device according to an embodiment of the present invention.

In the imaging device having the lens array, roof mirror array and the aperture device as described above, the width obtained by projecting the boundary between adjacent apertures of the aperture member on the roof mirror array may be greater than the distance between adjacent valley lines of the roof mirror array. In the imaging device having the lens array, the roof prism array and the aperture device as described above, the width obtained by projecting the boundary between adjacent apertures of the aperture member on the roof prism array may be greater than the distance between valley lines of the roof prism array. FIG. 41 shows an example of the latter case.

Referring to FIG. 41, the imaging device has a lens array 341, a roof prism array 342 and an aperture member 343 adjacent to the lens array 341. The width W2 obtained by projecting the boundary between adjacent apertures of the aperture member 343 is greater than the distance W1 between the valley lines of the roof prism array 342.

If the width W2 of the aperture member 343 is less than the distance W1 between valley lines of the roof prism array 342, the light L1 traveling past by the E lower edge of an aperture is reflected twice by the roof prism array 342 and ejected from a lens adjacent to a lens from which the light should be ejected. That is, the cross-talk light is generated.

On the other hand, in the case where the width W2 of the aperture member 343 is greater than the distance W1 between the valley lines of the roof prism array 342, as shown in FIG. 41, the light L2 traveling past by the lower edge of an aperture can be efficiently used to form an image.

A description will now be given, with reference to FIGS. 42A, 42B and 42C, of another embodiment of the present invention.

Figure 42A:
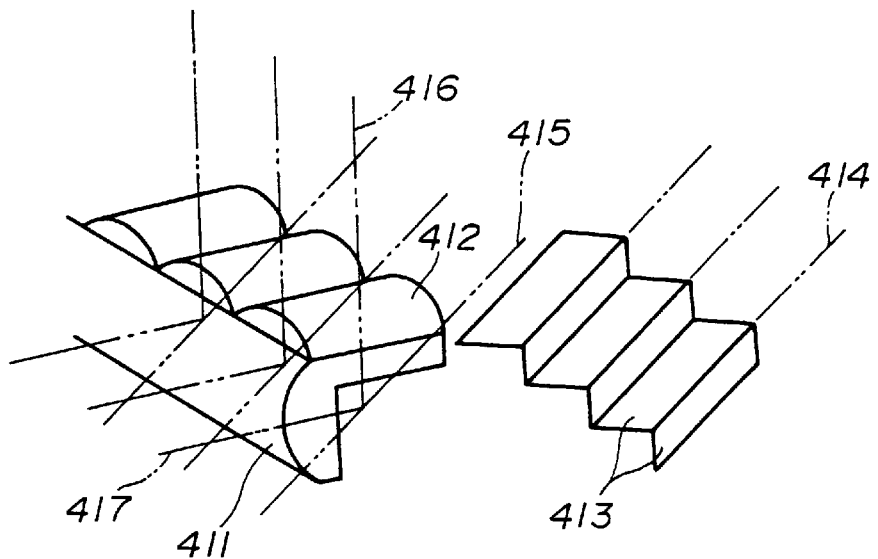
FIG. 42A is an exploded perspective view showing a structure of an imaging device according to an embodiment of the present invention.
Figure 42B:
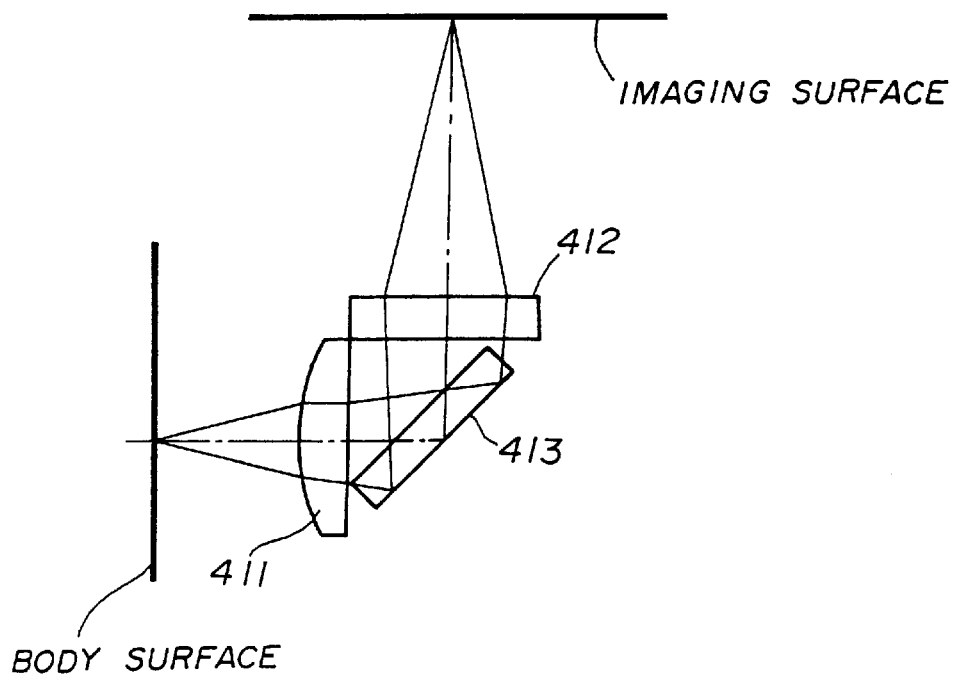
FIG. 42B is a cross sectional view showing the imaging device to explain incident and emitted light.
Figure 42C:
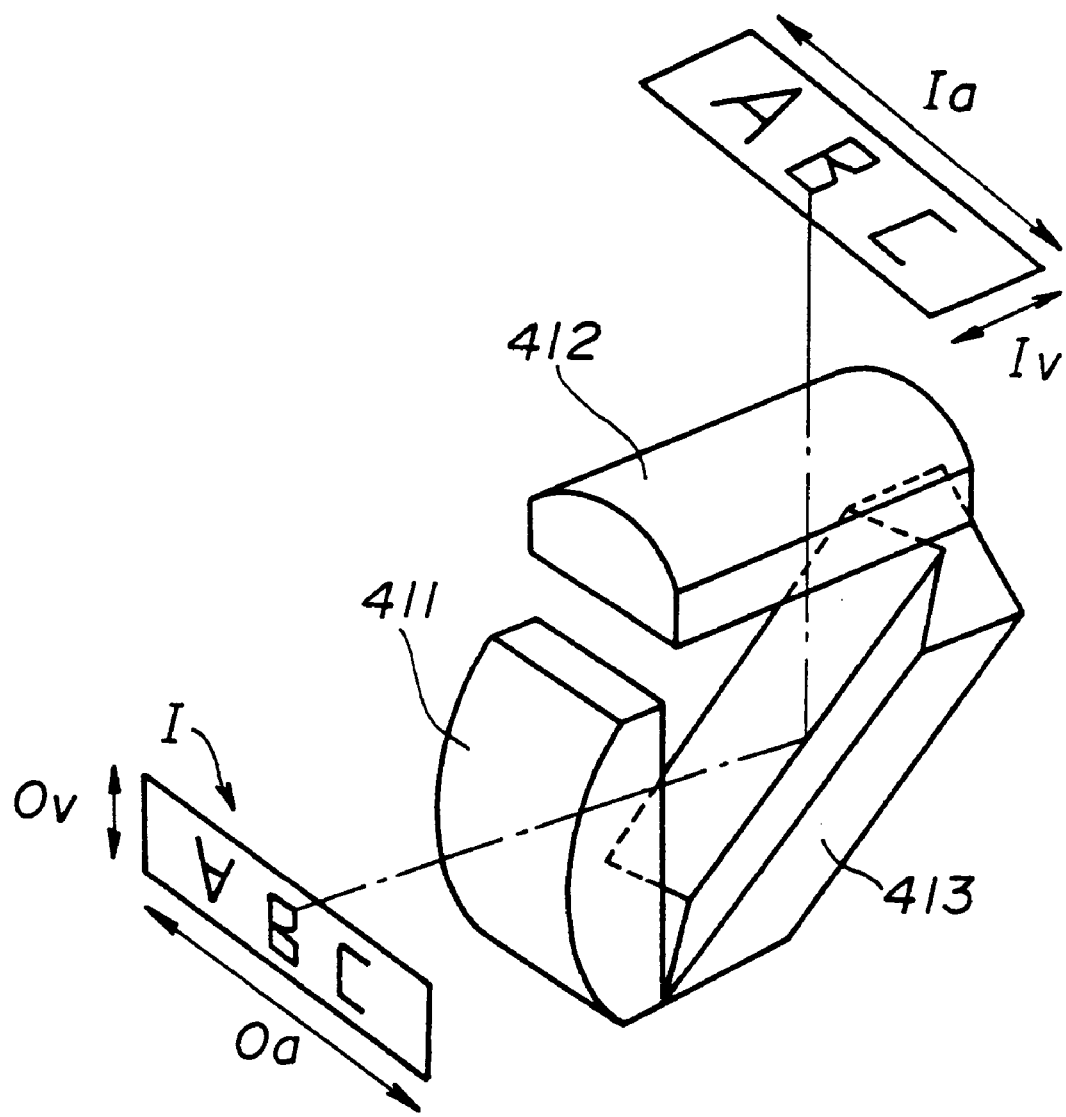
FIG. 42C is a diagram illustrating a function of the imaging device.

The structure of the imaging device according to this embodiment is shown in FIG. 42A, the incident light and the emitted light in the imaging device are shown in FIG. 42B, and an image formed on an imaging surface by the imaging device is shown in FIG. 42C.

Referring to FIGS. 42A, 42B and 42C, the imaging device has a condensing element 411, a lens array 412 and a roof mirror array 413. The condensing element 411 is formed, for example, of a cylindrical lens. The lens array 412 condenses incident light in a direction in which lenses are arranged. The lens array 412 is formed, for example, of a cylindrical lens array. The roof mirror array 413 has mirrors arranged at the same intervals as optical axes of the lenses of the lens array 412. In FIG. 42A, in order to describe the structure of the imaging device, the condensing element 411 and the lens array 412 are separated from the roof mirror array 413. However, in the actual imaging device, the condensing element 411 and the lens array 412 are integrated with the roof mirror array 413 in a state where ridge lines 414 of the roof mirror array 413 are at 45° with respect to the optical axes 416 and 417 of the condensing element 411 and the lens array 412.

A description will now be given, with reference to FIGS. 43A and 43B, of functions of the imaging device.

The imaging device is used, for example, as an optical reading system which forms an image of an original on an body surface on an imaging surface.

Figure 43A:
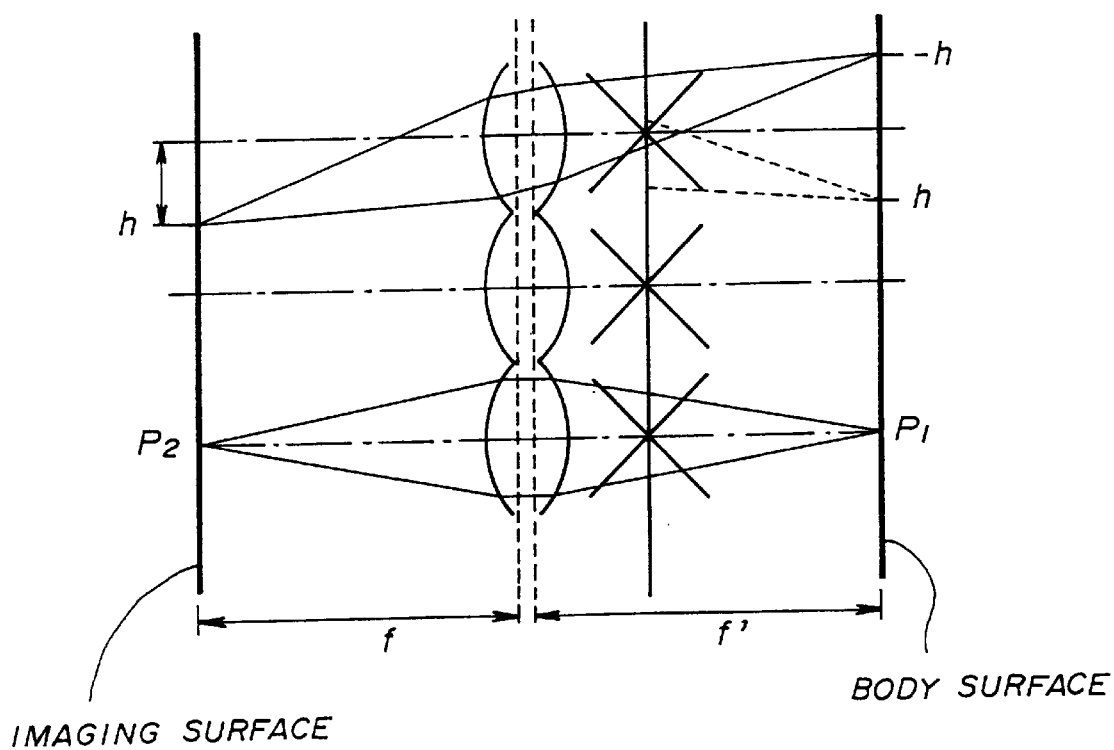
FIG. 43A is a diagram illustrating the optical principle of the imaging device according to the embodiment of the present invention.
Figure 43B:
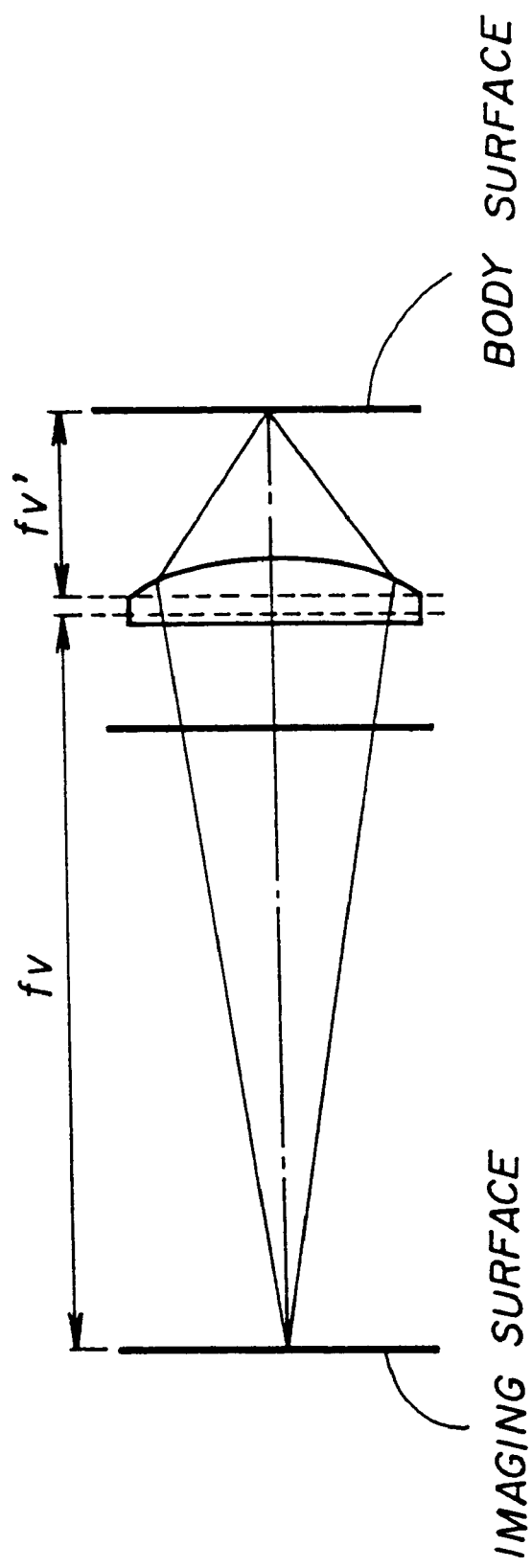
FIG. 43B is a diagram illustrating the principle of the condensing element which condenses the light in a direction perpendicular to a direction in which lenses are arranged.

Referring to FIG. 43A, in a case where the condensing element 411 is formed of symmetrical cylindrical lenses and focus positions (focus lengths) f' and f in the original side and an image side are equal to each other, an imaging magnification in the direction in which the lenses are arranged (in a lens arranging direction) is 1:1. The roof mirror array is located at the same intervals as the lenses of the lens array, so that an image is formed at a conjugate position with respect to the imaging surface. That is, information of an original (body) at the height of h is indicated as if light is emitted at a position of (-h), so that a corresponding image is formed at a position h on the imaging surface. The condensing element is located so that an image with an equimagnification in the lens arranging direction is formed, and the roof mirror array having a retroreflection function is located between the body (original) surface and the condensing element. As a result, images are continuously formed in the lens arranging direction.

A description will now be given of a case where an image is formed in a direction perpendicular to the lens arranging direction. Referring to FIG. 43B, the lens array 412 (the condensing element) having a function for condensing light in only a direction perpendicular to the lens arranging direction is located between the body surface and the roof mirror array. In this condensing element, the focus position (length) fv' in the body side is less than the focus position (length) fv in the imaging surface side. An image obtained by enlarging the original (the body) by a rate of about fv/fv' is formed on the imaging surface. Thus, as shown in FIG. 42C, an image obtained by enlarging the original in only the direction perpendicular to the lens arranging direction is formed.

In the imaging device as has been described above, the image magnification rate in the sub-scanning direction can be varied. Thus, in a case where the imaging device as described above is combined with a line sensor so that a contact type image sensor is formed, the contact type image sensor reads a substantially reduced area on an original in only the sub-scanning direction. As a result, the resolution of the sensor unit can be improved.

In addition, in a case where the imaging device is applied to a self scanning type LED print head, since the size of each of photo elements is reduced in only the longitudinal direction, the beam west can be improved.

In the production of the imaging device according to the present invention, the lens array and the roof mirror array are made of resin in the conventional solid forming process. Although two sets of lens arrays are needed in the conventional imaging device, the imaging device according to the present invention can be formed of one lens array and a cylindrical lens. Thus, it is not necessary for the imaging device according to the present invention to adjust axes of the lens arrays, that the imaging device according to the present invention can be easily made.

Due to using the conventional light trace simulation as the designing method, the imaging device can be optimized.

A description will now be given, with reference to FIG. 44A, of another embodiment of the present invention.

Figure 44B:
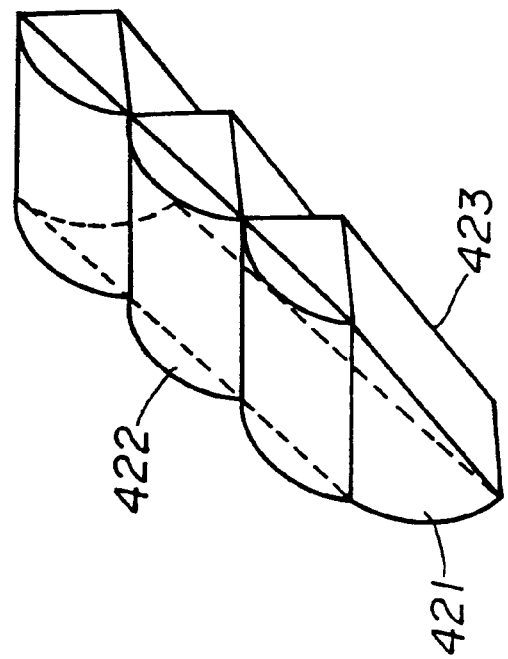
FIG. 44B is a diagram illustrating the imaging device according to the embodiment of the present invention.
Figure 44A:
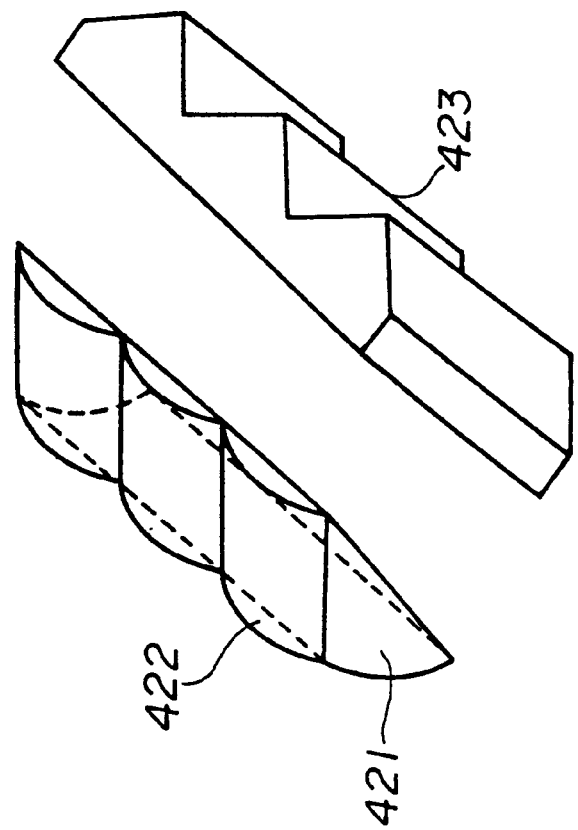
FIG. 44A is an exploded perspective view showing the imaging device according to another embodiment of the present invention.

Referring to FIG. 44A, the imaging device has a condensing element (a lens) 421, a lens array 422 and a roof prism array 423. The condensing element 421 is formed, for example, of a cylindrical lens. The condensing element 421 condenses the incident light in the direction perpendicular to the lens arranging direction. The lens array 422 condenses the light in only the lens arranging direction. The roof prism array 423 having prisms arranged in a line at the same intervals as the optical axes of the lens array 422.

The lens 421, the lens array and the roof prism array 423 are integrated with each other so that each ridge line of the roof prism array 423 is at 45° with respect to the axes of the lens 421 and the lens array 422. As a result, the imaging device shown in FIG. 44A has substantially the same function as that shown in FIGS. 42A, 42B and 42C.

FIG. 44B shows the imaging device according to another embodiment of the present invention. The imaging device has the condensing element 421, the lens array 422 and the roof prism array 423. The condensing element 421 condenses the incident light in the direction perpendicular to the lens arranging direction. The lens array 422 condenses the light in only the lens arranging direction. The roof prism array 423 has prisms arranged in a line at the same intervals as the optical axes of lenses of the lens array 422. The roof prism array 423 is different from that shown in FIG. 44A in shape.

According to the image device shown in FIG. 44B, information on the body surface is enlarged in only the direction perpendicular to the lens arranging direction so that an image is formed. In addition, the image magnification rate in the sub-scanning direction can be changed.

The roof prism array includes reflection surfaces inside. That is, the evaporation coating used to form reflection surfaces in the roof mirror is not needed. Thus, the productivity of the imaging device can be improved and the production cost can be reduced.

Figure 45B:
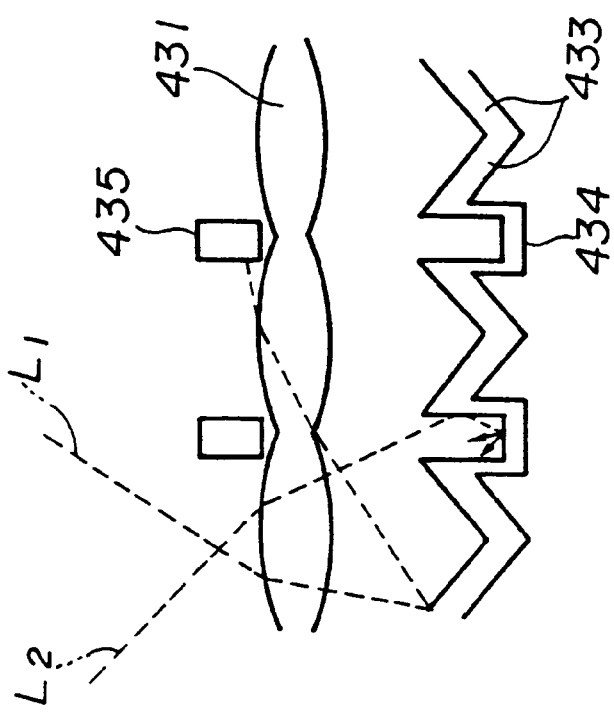
FIG. 45B is a perspective view showing the imaging device according to the embodiment of the present invention.
Figure 45A:
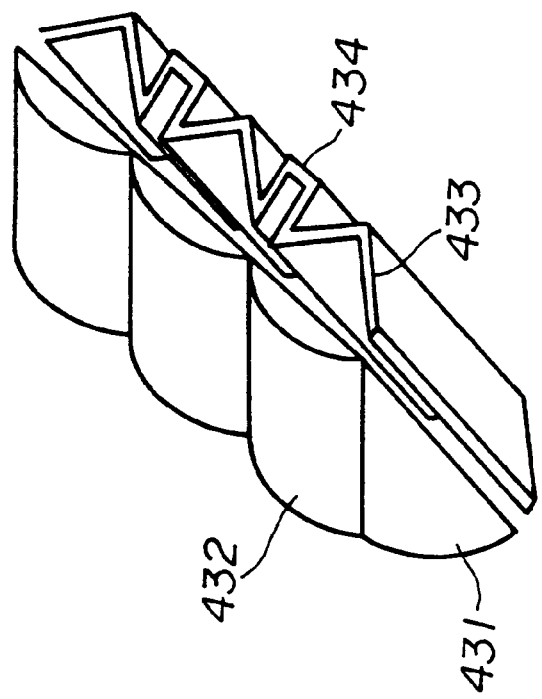
FIG. 45A is a diagram illustrating the structure of the imaging device according to another embodiment of the present invention.

FIGS. 45A and 45B show an imaging device according to another embodiment of the present invention. FIG. 45A shows the structure of the imaging device and FIG. 45B shows a perspective view of the imaging device.

Referring to FIGS. 45A and 45B, the imaging device has a condensing element 431, a lens array 432, a roof mirror array 433 and an aperture array member 435. The condensing element 431 condenses the incident light in the direction perpendicular to the lens arranging direction. The lens array (a condenser array) 432 condenses the light in only the lens arranging direction. The roof mirror array 433 has ridge lines which are perpendicular to an array direction of the lens array 432 and arranged at the same intervals as the lenses of the condensing element 431. A groove 434 is formed between adjacent mirrors of the roof mirror array 433.

The light L1 reflected once by the roof mirror passes through the condensing element 431 and is intercepted by the aperture array member 435. As a result, the flare light is prevented from being emitted from the imaging device. When the light L2 is incident on a boundary between the mirrors of the roof mirror array 433, the light L2 is led into the groove 434 and scattered in the groove 434. As a result, the ghost light can be prevented from being emitted from the imaging device.

Figure 46A:
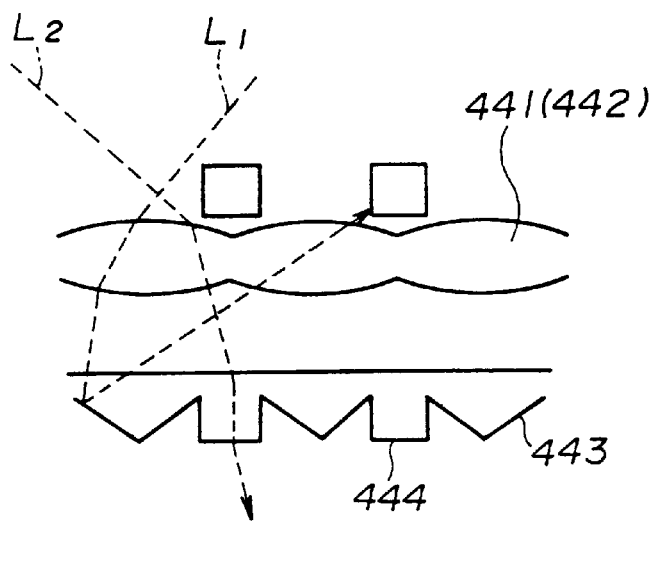
FIG. 46A is a diagram illustrating the structure of the imaging device according to another embodiment of the present invention.
Figure 46B:
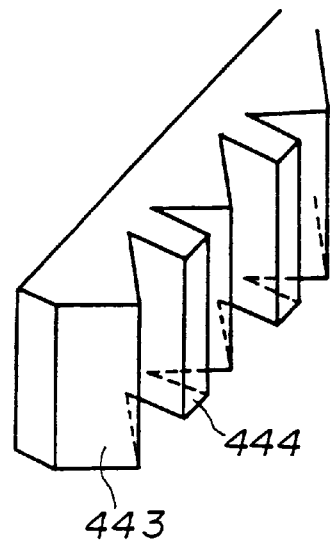
FIG. 46B is a perspective view showing a roof prism of the imaging device.
Figure 46C:
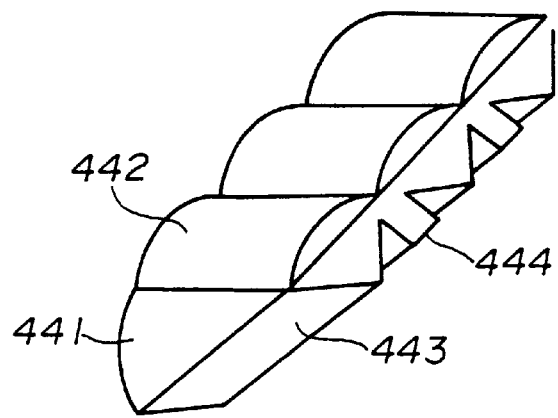
FIG. 46C is a perspective view showing a part of the imaging device.
Figure 46E:
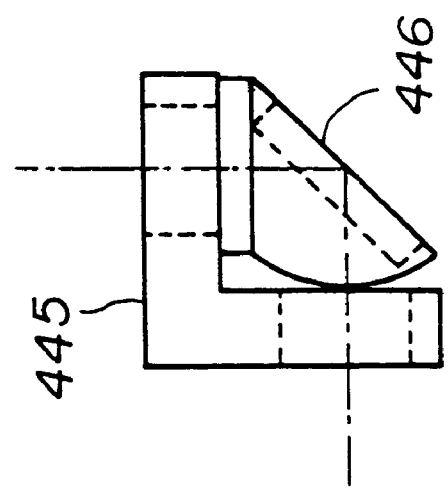
FIG. 46E is a side view showing the imaging device according to the embodiment of the present invention.
Figure 46D:
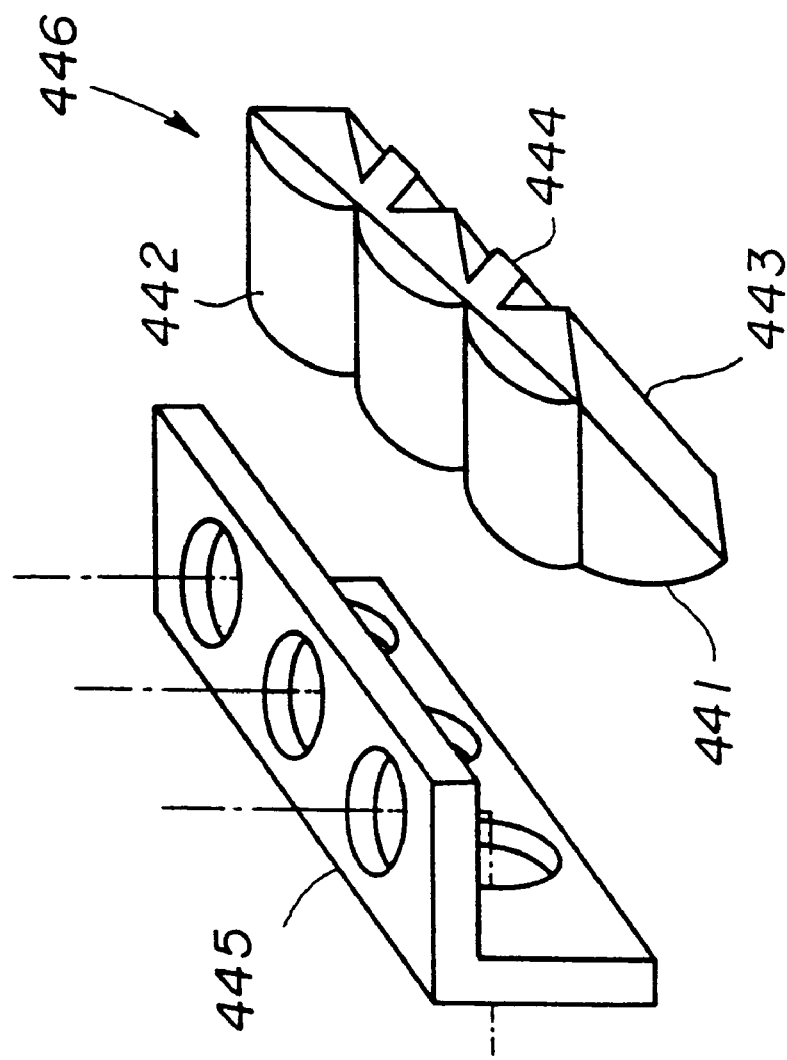
FIG. 46D is an exploded perspective view showing the imaging device.

FIGS. 46A, 46B, 46C, 46D and 46E show the imaging device according to another embodiment of the present invention. FIG. 46A shows the structure of the imaging device. FIG. 46B shows a perspective view of a roof prism array used in the imaging device. FIG. 46C shows a perspective view of a set into which an condensing element and the roof prism array are integrated. FIG. 46D shows an exploded perspective view of the imaging device. The FIG. 46E shows a side view of the imaging device.

Referring to FIGS. 46A–46E, the imaging device has a condensing element (a lens) 441, a condensing element (lens) array 442, a roof prism array 443 and an aperture array member 445. The condensing element 441 condenses the incident light in the direction perpendicular to the lens arranging direction. The condensing element array 442 condenses the light in only the lens arranging direction. The roof prism array 443 has prisms are arranged in a line perpendicular to an array direction of the condensing element array 442 at the same intervals as the elements (the lenses) of the condensing element array 442. A projection 444 is formed between adjacent prisms of the roof prism array 443. The aperture array member 445 has apertures facing the lens arrays in the image side and the body side. The respective condensing element arrays and the roof prism lens array are integrated into a single member 446.

The imaging device has the same function as that shown in FIG. 44A. Further, as shown in FIG. 46A, the light L1 reflected once by the reflection surface of the roof prism array 443 passes through the condensing element array and is intercepted by a boundary between adjacent apertures of the aperture array member 445. As a result, the flare light can be prevent from being emitted from the imaging device. In addition, the light L2 incident on a boundary between adjacent prisms of the roof prism array 443 passes through the projection 444 without being emitted from the condensing element array 441 (442). Thus, the ghost light can be prevent from being emitted from the imaging device.

The present invention is not limited to the aforementioned embodiments, and other variations and modifications may be made without departing from the scope of the claimed invention.

What is claimed is:

1. An imaging device comprising:
   a lens array in which lenses are arranged in a line, said lenses being optically equivalent;
   a roof mirror array having roof mirrors arranged in a line parallel to a direction in which said lenses of said lens array are arranged; and
   an aperture member having apertures arranged so as to correspond to said lenses of said lens array, wherein said roof mirrors comprise at least two roof mirrors for each lens of said lens array, a center of an interval between axes of adjacent lenses of said lens array corresponding to a ridge line of one of said at least two roof mirrors.

2. An imaging device comprising:
   a lens array in which lenses are arranged in a line, said lenses being optically equivalent;
   a roof prism array having prisms arranged in a line parallel to a direction in which said lenses of said lens array are arranged, said roof prism array being integrated with said lens array and made of the same material as said lens array; and an aperture member having apertures arranged so as to correspond to the lenses of said lens array, wherein said roof prim comprises at least two roof prisms for each lens of said lens array, a center of an interval between axes of adjacent lenses of said lens array corresponding to a ridge line of one of said at least two roof prisms.

3. An image device comprising:

a first lens array, located in an incidence side having optically equivalent lenses arranged in a line;

a second lens array, which is located in an image side and is optically equivalent to said first lens array, having lenses arranged so that each of optical axes is perpendicular to an optical axis of a corresponding one of the lenses of said first lens array;

a roof mirror array having roof mirrors, arranged in a line perpendicular to a direction in which said lenses of said first lens way are arranged and also perpendicular to a direction in which said lenses of said second lens array are arranged, a ridge line of each roof mirror of said roof mirror array is inclined at 45° with respect to a plane including an optical axis of each lens of said first and second lens arrays; and an aperture member having apertures arranged so as to correspond to the lenses of said first and second lens arrays, wherein said roof mirrors comprise at least two roof mirrors for each pair of the lenses of said first and second lens arrays, a center of interval between axes of adjacent lenses of each of said first and second lens arrays corresponding to a ridge line of one of said at least two roof mirrors.

4. An imaging device comprising:

a first lens array, located in an incidence side, having optically equivalent lenses arranged in a line;

a second lens array, which is located in an image side and is optically equivalent to said first lens array, having lenses arranged so that each of optical axes is perpendicular to an optical axis of a corresponding one of the lenses of said first lens array;

a roof prism array having roof prisms, arranged in a line perpendicular to a direction in which said lenses of said first lens array are arranged and also perpendicular to a direction in which said lenses of said second lens array are arranged, a ridge line of each roof prism of said roof prism array is inclined at 45° with respect to a plane including an optical axis of each lens of said first and second lens arrays, said roof prism array being integrated with said first and second lens arrays and made of the same material as said first and second lens arrays; and an aperture member having apertures arranged so as to correspond to the lenses of said first and second lens arrays, wherein said roof prisms comprise at least two roof prisms for each pair of the lenses of said first and second lens arrays, a center of interval between axes of adjacent lenses of each of said first and second lens arrays corresponding to a ridge line of one of said at least two roof prisms.

5. The imaging device as claimed in claim 1, wherein said roof mirror array is formed of the same shaped mirrors.

6. The imaging device as claimed in claim 3, wherein said roof mirror array is formed of the same shaped mirrors.

7. The imaging device as claimed in claim 2, wherein said roof prism array is formed of the same shaped prisms.

8. The imaging device as claimed in claim 4, wherein said roof prism array is formed of the same shaped prisms.

9. The imaging device as claimed in claim 1, wherein a width obtained by projecting a boundary between adjacent apertures of said aperture member on said roof mirror array is greater than a width of a roof mirror of said roof mirror array.

10. The imaging device as claimed in claim 3, wherein a width obtained by projecting a boundary between adjacent apertures of said aperture member on said roof mirror array is greater than a width of a roof mirror of said roof mirror array.

11. The imaging device as claimed in claim 2, wherein a width obtained by projecting a boundary between adjacent apertures of said aperture member on said roof prism array is greater than a width of a roof prism of said roof mirror array.

12. The imaging device as claimed in claim 4, wherein a width obtained by projecting a boundary between adjacent apertures of said aperture member on said roof prism array is greater than a width of a roof mirror of said roof prism array.

13. An imaging device comprising:

a condensing element array having elements each of which condenses light in only an arranging direction in which said elements are arranged;

a condensing element which condenses light in a direction perpendicular to the arranging direction; and a roof mirror array having mirrors arranged at the same intervals as those at which said elements of said condensing element array are arranged.

14. An imaging device comprising:

a condensing element array having elements each of which condenses light in only an arranging direction in which said elements are arranged;

a condensing element which condenses light in a direction perpendicular to the arranging direction; and a roof prism array having prisms arranged at the same intervals as those at which said elements of said condensing element array are arranged.

15. An imaging device comprising:

a condensing element array having elements each of which condenses light in only an arranging direction in which said elements are arranged;

a condensing element which condenses light in a direction perpendicular to the arranging direction;

a roof mirror array having ridge lines which are perpendicular to the arranging direction and arranged at the same intervals as those at which said elements of said condensing element array are arranged; and an aperture member having apertures arranged so as to correspond to said elements of said condensing element array, wherein a groove is formed in each boundary portion between adjacent roof mirrors of said roof mirror array.

16. An imaging device comprising:

a condensing element array having elements each of which condenses light in only an arranging direction in which said elements are arranged;

a condensing element which condenses light in a direction perpendicular to the arranging direction;

a roof prism array having ridge lines which are perpendicular to the arranging direction and arranged at the same intervals as those at which said elements of said condensing element array having arranged; and an aperture member having apertures arranged so as to correspond to said elements of said condensing element array, wherein a projection portion is formed in each boundary portion between adjacent roof prisms of said roof prism array.

* * * * *